US006334076B1

(12) United States Patent
Sakurai et al.

(10) Patent No.: US 6,334,076 B1
(45) Date of Patent: Dec. 25, 2001

(54) METHOD OF AND APPARATUS FOR AUTOMATICALLY GENERATING CONTROL PROGRAMS FOR COMPUTER CONTROLLED SYSTEMS

(75) Inventors: Takakazu Sakurai, Mito; Toshiaki Shimbori, Katsuta; Katsuhiko Doi; Yoshito Uehara, both of Kurashiki, all of (JP)

(73) Assignees: Hitachi, Ltd.; Kawasaki Steel Corporation, both of Tokyo (JP)

( * ) Notice: Subject to any disclaimer, the term of this patent is extended or adjusted under 35 U.S.C. 154(b) by 0 days.

(21) Appl. No.: 09/240,692

(22) Filed: Feb. 2, 1999

Related U.S. Application Data

(63) Continuation of application No. 08/327,890, filed on Oct. 24, 1994, now Pat. No. 6,026,336, which is a continuation of application No. 07/582,180, filed on Sep. 24, 1990, now abandoned.

(30) Foreign Application Priority Data

Jan. 25, 1989 (JP) .................................................. 1-013949

(51) Int. Cl.⁷ .............................. G05B 15/02; G06F 9/06
(52) U.S. Cl. .................................. 700/86; 700/87; 700/18
(58) Field of Search ................................. 700/86, 87, 83, 700/18, 17; 345/302, 326

(56) References Cited

U.S. PATENT DOCUMENTS

| 4,315,315 | * | 2/1982 | Kossiakoff | 364/516 |
|---|---|---|---|---|
| 4,570,217 | | 2/1986 | Allen et al. | 364/188 |

(List continued on next page.)

FOREIGN PATENT DOCUMENTS

| 55776 | 1/1980 | (JP) . |
|---|---|---|
| 58165109 | 9/1983 | (JP) . |
| 60237542 | 11/1985 | (JP) . |
| 6137548 | 3/1986 | (JP) . |
| 62128335 | 6/1987 | (JP) . |
| 6318401 | 1/1988 | (JP) . |
| 63151004 | 10/1988 | (JP) . |

OTHER PUBLICATIONS

"IECON '90", Sixteenth Annual Conf. Of IEEE Industrial Electronics Society, Ref. No. ET–29, No Date.
"A Program Development Tool", Alberga, et al, IBM J. Res. Develop. vol. 28, No. 1, 1/84.

*Primary Examiner*—Paul P. Gordon
(74) *Attorney, Agent, or Firm*—Antonelli, Terry, Stout & Kraus, LLP

(57) ABSTRACT

A method of and apparatus for automatically generating a program for controlling a computer controlled system such as a plant. A number of general and standard program modules 49, 51 are prepared beforehand. A standard module is selectively displayed on a display device 21 as a graphics information image. Standard modules are combined as desired in accordance with a system operation procedure to generate customized program modules 50, 52 which are stored as graphics information images in stackers 155. A number of customized modules are generated for respective program functions. Customized modules are compiled to generate source programs, and thereafter assembled to generate intermediate level modules not addressed which are then combined and edited to generate a load module program.

26 Claims, 26 Drawing Sheets

U.S. PATENT DOCUMENTS

| | | | |
|---|---|---|---|
| 4,636,938 | * | 1/1987 | Broome .................................. 700/86 |
| 4,663,704 | | 5/1987 | Jones et al. ......................... 364/188 |
| 4,736,340 | * | 4/1988 | Desserrieres et al. ................ 700/86 |
| 4,742,467 | * | 5/1988 | Messerich et al. .................... 700/90 |
| 4,831,525 | | 5/1989 | Saito et al. . |
| 4,868,770 | | 9/1989 | Smith et al. ......................... 364/578 |
| 4,870,397 | * | 9/1989 | Soto et al. ........................... 340/747 |
| 4,885,695 | | 12/1989 | Fujimoto .............................. 364/191 |
| 4,956,773 | | 9/1990 | Saito . |
| 4,965,742 | | 10/1990 | Skeirik ................................ 364/138 |
| 4,991,076 | | 2/1991 | Zitterer et al. ....................... 364/192 |
| 5,005,119 | | 4/1991 | Rombaugh et al. ................. 364/191 |
| 5,008,810 | | 4/1991 | Kessel et al. ........................ 364/191 |
| 5,019,961 | | 5/1991 | Addesso et al. ..................... 364/192 |
| 5,051,898 | | 9/1991 | Wright et al. ........................ 364/200 |
| 5,465,215 | * | 11/1995 | Strickland et al. ............. 364/474.22 |
| 5,530,643 | * | 6/1996 | Hodorowski ......................... 364/191 |
| 5,581,759 | * | 12/1996 | Ohhashi et al. ..................... 364/147 |
| 5,841,656 | * | 11/1998 | Taruishi .............................. 364/191 |

\* cited by examiner

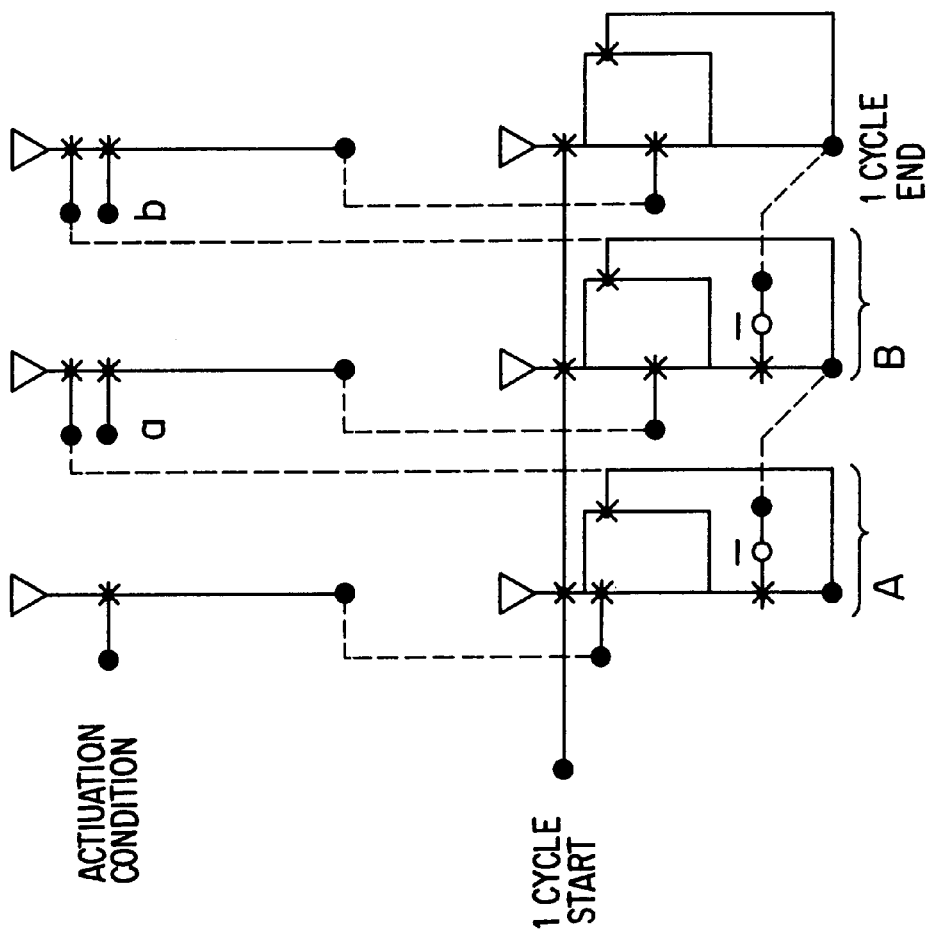
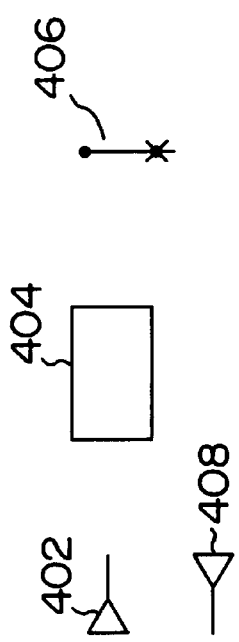
FIG. 4A
FIG. 4B
FIG. 4C

FIG. 6A   FIG. 6B   FIG. 6C   FIG. 6D
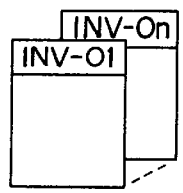
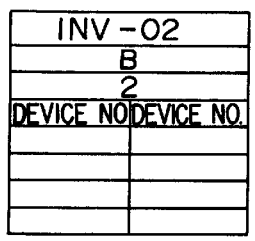
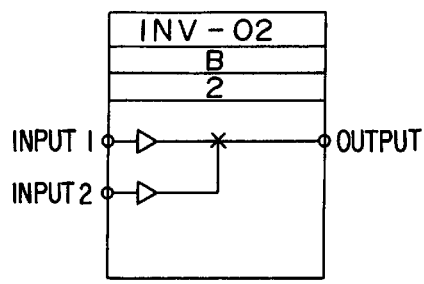
FIG. 6E
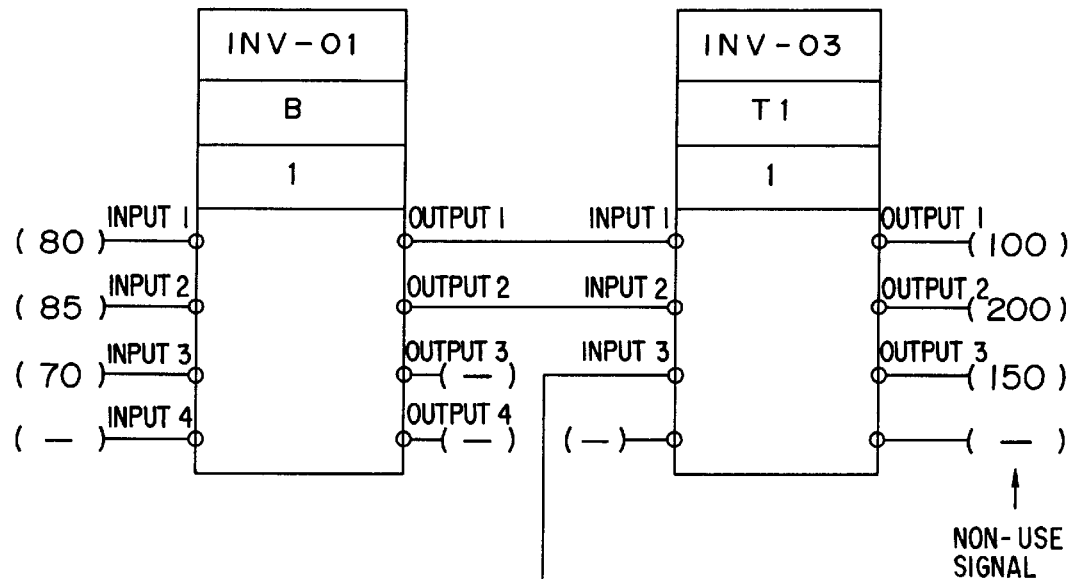
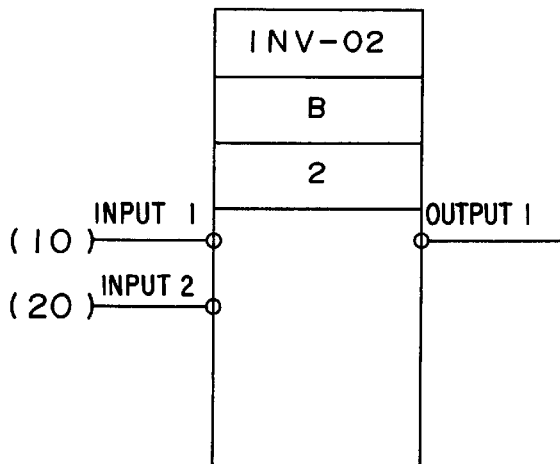

FIG. 8
VECTOR MOTOR LIST

| REV | DEVICE NO. | MACHINE ITEM NO. | APPLICATION ABBREVIATION WITHIN ( ) | NUMBER | OUTPUT (KW) | SPEED (rpm) | VOLTAGE (V) | RATED CURRENT (A) | EXCITING CURRENT (A) | TYPE | RATING | INSULATION | CONTROL METHOD | PROTECTION METHOD | AMBIENT TEMPERATURE(°C) | TERMINAL POSITION | ROTATION DIRECTION |
|---|---|---|---|---|---|---|---|---|---|---|---|---|---|---|---|---|---|
|  | AV-1P0-02 |  | NO. 1 PAYOFF REEL (1 POR) | 1 | 185 | 250/1400 | 260/410 |  |  | EFFO-K | CONT 200% 1 MIN. 255% TRANSIENT | F | R |  | 40 |  |  |
|  |  |  | MOTOR MANUFACTURE SPECIFICATION | 1 | 260 | 350/400 |  |  |  |  |  |  |  |  |  |  |  |
|  | AV-1P0-03 |  | UPPER PATH LEVELER FRONT PINCH ROLL (UPPER) | 1 | 11 | 84 (4P) | 380 |  |  | TEFM | CONT 150% 1 MIN. | F | R |  | 40 |  |  |
| R1 | AV-1P0-03 |  | UPPER PATH LEVELER FRONT PINCH ROLL (UPPER) (UPPER PATH LEVELER OVER PR) | 1 | 11 | 47 (4P) | 380 |  |  | TEFM | CONT 150% 1 MIN. | F | R |  | 40 |  |  |
|  | AV-1P0-04 |  | UPPER PATH LEVELER FRONT PINCH ROLL (UNDER) (UPPER LEVELER UNDER PR) | 1 | 3.7 | 244 (4P) | 380 |  |  | TEFM | CONT 150% 1 MIN. | F | R |  | 40 |  |  |

FIG. 9

1 DRIVING MACHINE

| DEVICE NO. | FACILITY: TENSION LEVELER APPLICATION | TYPE | NUMBER | OUTPUT(KW) | SPEED(rpm) | VOLTAGE | RATED CURRENT | EXITING CURRENT |
|---|---|---|---|---|---|---|---|---|
| AM-TLS-01 | NO.1 EXPANSION ROLL DRAFT ADJUSTMENT | TEFC | ① | 3.7 | 1800 (1/17) | 440 | | |
| AM-TLS-02 | NO.2 EXPANSION ROLL DRAFT ADJUSTMENT | TEFC | ① | 3.7 | 1800 (1/17) | 440 | | |
| AM-TLS-03 | NO.1 CORRECTION ROLL DRAFT ADJUSTMENT | TEFC | ① | 1.5 | 1800 (1/17) | 440 | | |
| AM-TLS-04 | NO.2 CORRECTION ROLL DRAFT ADJUSTMENT | TEFC | ① | 1.5 | 1800 (1/17) | 440 | | |
| AM-TLS-05 | INPUT SIDE NO.1 LUBRICATION PUMP | TEFC | | 3.7 | 1200 | 440 | | |
| AM-TLS-06 | INPUT SIDE NO.2 LUBRICATION PUMP | TEFC | | 3.7 | 1200 | 440 | | |
| AV-TLS-01 | BRIDLE MAIN MOTOR | EFFO-KI | | 500 | 600/900 | 370 | | |
| AV-TLS-02 | BRIDLE EXTENSION RATE CONTROL | EFFO-KI | | 37 | 1195 | 410 | | |

2 VALVE

| DEVICE NO. | APPLICATION | TYPE | A EXCITE | N | B EXCITE | POWER | STROKE | SPEED | NOTE |
|---|---|---|---|---|---|---|---|---|---|
| DS-TLS-01 | SNUBBER ROLL | 2S-2P | CLOSE | – | OPEN | PNEUMATIC | | | |
| DS-TLS-02 | QUICK OPEN / CLOSE | 2S-3P | CLOSE | HOLD | OPEN | HYDRAULIC | | | |
| DS-TLS-03 | QUICK OPEN / CLOSE | 2S-3P | CLOSE | HOLD | OPEN | HYDRAULIC | | | |
| DS-TLS-04 | QUICK OPEN / CLOSE | 2S-3P | CLOSE | HOLD | OPEN | HYDRAULIC | | | |
| DS-TLS-05 | QUICK OPEN / CLOSE | 2S-3P | CLOSE | HOLD | OPEN | HYDRAULIC | | | |
| DS-TLS-06 | UPPER FRAME REVERSED | 2S-3P | OPEN | HOLD | CLOSE | HYDRAULIC | | | |
| DS-TLS-07 | UPPER FRAME LOCK | 2S-2P | LOCK | – | UNLOCK | HYDRAULIC | | | |
| DS-TLS-08 | SNUBBER ROLL | 2S-2P | CLOSE | – | OPEN | PNEUMATIC | | | |

3 SENSOR

| DEVICE NO. | APPLICATION | TYPE | OPERATION |
|---|---|---|---|
| PX-TLS-01 | EXPANSION DRAFT | | ON AT DRAFT UPPER LIMIT |
| PX-TLS-02 | EXPANSION DRAFT | | ON AT DRAFT LOWER LIMIT |
| PX-TLS-03 | EXPANSION QUICK OPEN | | ON AT INTERMEDIATE OPEN |
| LS-TLS-01 | EXPANSION QUICK OPEN | | ON AT OPEN LIMIT |
| PX-TLS-04 | SS DRAFT | | ON AT DRAFT UPPER LIMIT |

TO FIG. 14B

FIG. 16C AFTER MODULE EDITING
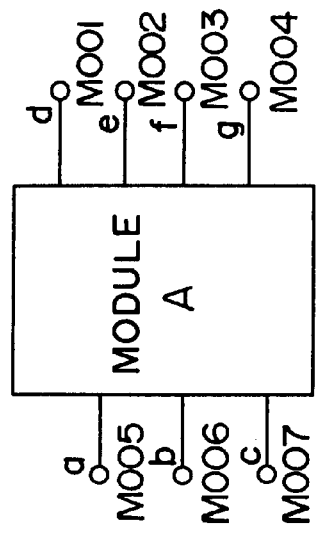
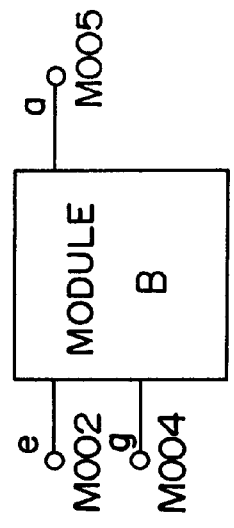
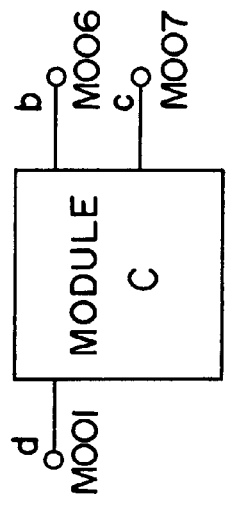
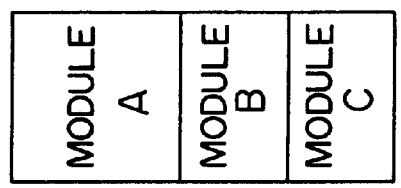
FIG. 16B BEFORE MODULE EDITING
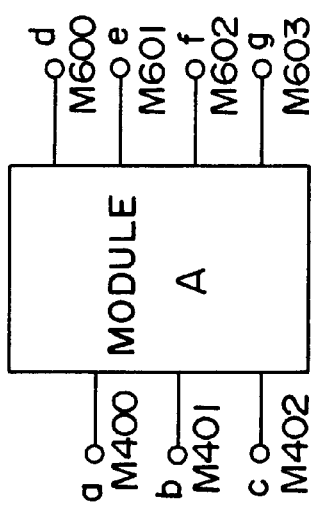
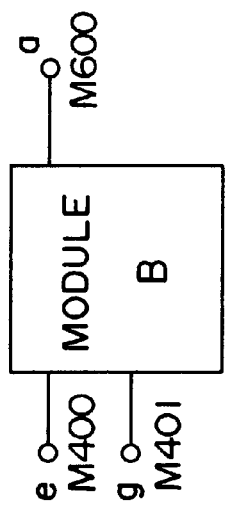
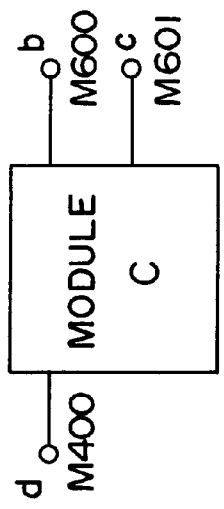

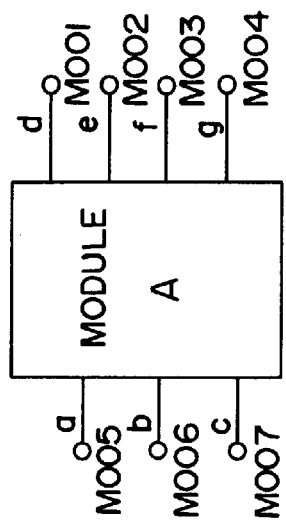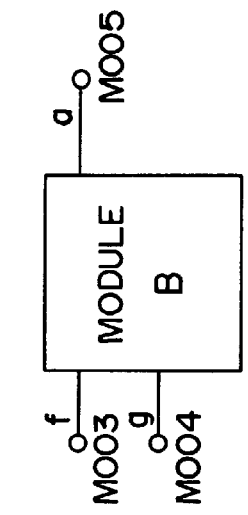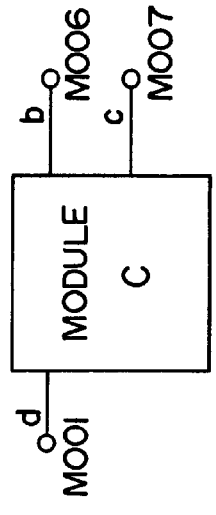
FIG. 19B
MODULE B AFTER MODIFICATION
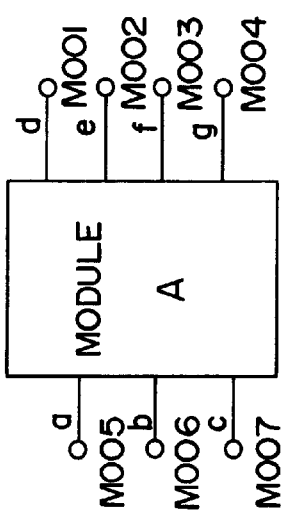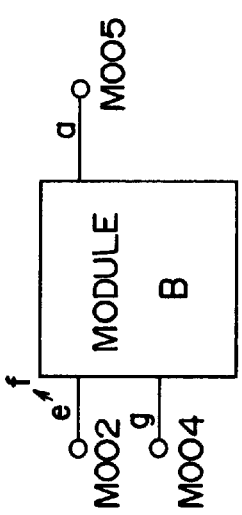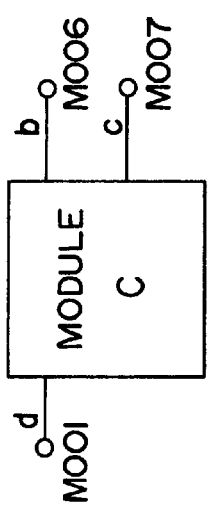
FIG. 19A
MODULE B BEFORE MODIFICATION

METHOD OF AND APPARATUS FOR AUTOMATICALLY GENERATING CONTROL PROGRAMS FOR COMPUTER CONTROLLED SYSTEMS

This is a continuation of U.S. Pat. No. 6,026,336, issued Feb. 15, 2000; which is a continuation of Ser. No. 07/582,180, filed Sep. 24, 1990 now abandoned.

TECHNICAL FIELD

The present invention relates to a method of and apparatus for automatically generating control programs for computer controlled systems such as rolling plants, power plants, and chemical plants.

BACKGROUND ART

Various types of plants such as rolling plants and power plants are controlled in practice directly and digitally by using computers. In such a case, it becomes necessary to provide computer programs in accordance with a plant operation procedure. In generating computer programs for controlling a plant, an operation procedure for a driving machine has been conventionally determined at a meeting arranged between system engineers and users, in accordance with a plant operation procedure (provided in the form of a plant operation function specification). In accordance with the driving machine operation procedure, program engineers of a maker side generate programs. Although system engineers and program engineers consult each other beforehand for providing appropriate programs, system engineers cannot check whether or not the resultant programs can execute the driving machine operation procedure as desired. In addition, the contents of programs vary with the ability of program engineers. In order to solve such problems, it has been proposed that regular programs frequently used are prepared in the form of modules and these program modules are coupled together to automatically provide necessary programs. Such automatic program generation is described, for example, in Japanese Patent Laid-open Publication JP-A-62-12335.

In an automatic program generating method heretofore proposed, a program engineer compiles program modules and forms a source program which is in turn assembled into a load module written in machine language. Accordingly, a system engineer cannot check the quality of the function of programs as to whether or not they conform with the driving machine operation procedure, until the plant is caused to run actually. There is also associated with a problem that a system engineer alone cannot modify programs even if the plant operation procedure is changed. On the user side, there is also associated with a problem that it is not possible to check the function of programs and modify them because of a difficulty of having program engineers on the user side.

It is an object of the present invention to provide a method of automatically generating control programs for a computer controlled system capable of readily checking and modifying the function of automatically generated programs even by computer programming novices.

It is another object of the present invention to provide a method of automatically generating control programs for a computer controlled system capable of readily checking the execution contents of programs before a plant is caused to run actually.

It is a further object of the present invention to provide a method of automatically generating control programs for a computer controlled system capable of readily testing generated program modules.

It is another object of the present invention to provide an apparatus for automatically generating control programs for a computer controlled system capable of readily confirming and modifying the function of automatically generated programs even by computer programming novices.

It is a further object of the present invention to provide an apparatus for automatically generating control programs for a computer controlled system capable of readily checking the execution contents of programs before a plant is caused to run actually.

It is another object of the present invention to provide an apparatus for automatically generating control programs for a computer controlled system capable of readily testing generated program modules.

The other objects of this invention will become apparent from the following description.

DISCLOSURE OF INVENTION

According to one aspect of this invention, a number of general purpose standard program modules (standard modules) are prepared beforehand, and selected standard modules are displayed as graphics or picture information on a display unit. A desired combination of standard program modules is selected in accordance with a plant operation procedure to form a customized program module (customized module) which is stored in a stocker in the form of graphics information. A number of customized modules are also formed for each program function. These customized modules are compiled to form a source program which is in turn assembled to form intermediate modules not addressed. The intermediate modules are combined and edited to form a load module program.

According to another aspect of the present invention, while a plant is caused to run in accordance with a generated program, the contents of the program under execution are displayed on a display unit in the form of a plant operation function specification, to thereby allow a real time monitor of the program.

According to a further aspect of the present invention, the contents of a desired customized program module can be displayed on a display unit in the form of a plant operation function specification.

According to the present invention, customized modules are held as graphics information in the form of a plant operation function specification. Therefore, the function of a program can be checked from the displayed graphics information, and the program can be modified by changing the displayed graphics information. Computer programming novices can accordingly check and modify a program easily.

Furthermore, according to the present invention, the contents of programs to be executed when a plant is caused to run can be monitored in real time in the form of a plant operation function specification. Accordingly, the control contents during an abnormal operation can be grasped readily so that the countermeasure for the abnormal operation can be carried out properly.

Furthermore, since a program can be displayed and monitored in the form of a plant operation function specification, a program module can be tested easily.

BRIEF DESCRIPTION OF DRAWINGS

FIGS. 4A to 4C are schematic diagrams showing standard and customized modules of SFC;

FIGS. 6A to 6D show examples of blocks used in a block diagram;

FIG. 6E shows an example of a customized module for a block diagram;

FIG. 8 shows an example of a list of devices used in a plant;

FIG. 9 shows an example of list data;

FIGS. 16A to 16C are diagrams for illustrating module editing;

FIGS. 19A and 19B are diagrams for illustrating modifying modules;

BEST MODE FOR CARRYING OUT THE INVENTION

The present invention is applicable to control programs for any computer controlled system. As one example of such applications, there will be described an embodiment of this invention applied to a computer controlled system in which rolling plant facilities are controlled directly and digitally by using plant controllers (PLC).

Figure 1:
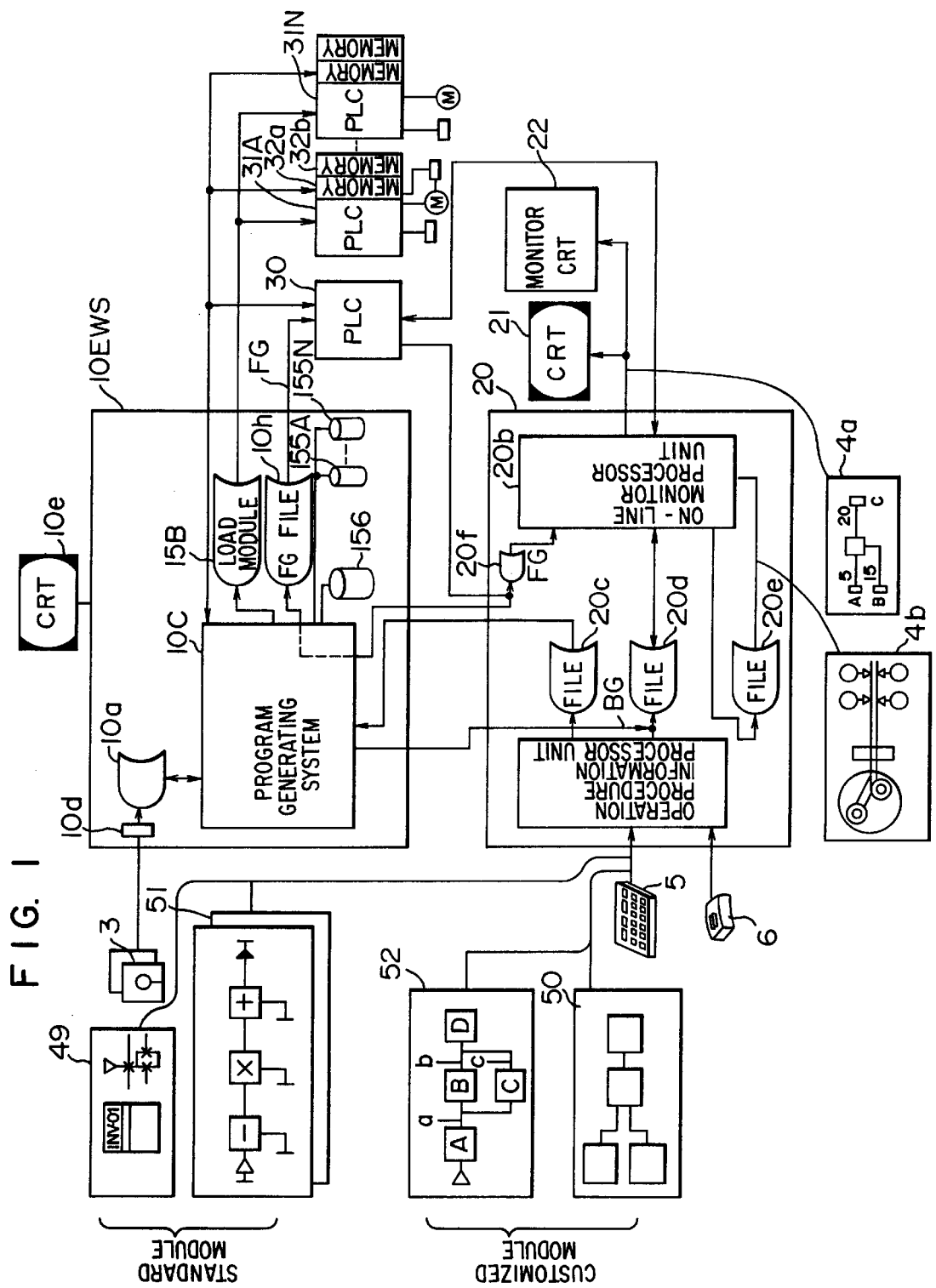
FIG. 1 shows the structure of an embodiment of this invention.

FIG. 1 shows the system arrangement of the embodiment of this invention. In FIG. 1, reference numeral 10 represents an engineering work station (EWS), 20 a display controller (CRT controller), 21 a CRT dedicated to the CRT controller, 22 a monitor CRT, 30 a PLC for CRT control, 31A to 31N PLCs for plant facilities control, and 5 a keyboard from which an operator enters a plant operation procedure in concern and the like. As a software generating system, these elements are organically coupled together to provide a function to generate software. Reference numerals 52 and 50 show examples of a plant operation control specification which is supplied from the CRT controller 20 to EWS as a customized module when a program for PLC is to be generated. A customized module is a program which is generated for each plant in accordance with standard modules. A standard module is a program module which is registered beforehand in a standard stacker 156 and has a function independent from the type of plant. 4a indicates an example of a displayed image on CRT 21 by way of which the program in concern is monitored. A picture representative of the plant operation control specification entered for the generation of a program can be viewed on CRT 21. A plant is caused to run actually under a program for PLC. However, the conditions of actual plant operation can be monitored in the form of a plant operation control specification entered for the generation of the program. Conventionally, a person who knows the contents of PLC compares the operation of a program with the actual operation of a plant, and judges if the program controls the plant correctly. According to the present invention, an operator of a plant can judge it. CRT 21 is used for monitoring an ordinary plant operation, displaying inputted information for the generation of a plant control program, monitoring a program operation, and displaying a modification of a program.

The inputted plant operation control specification is decoded by the CRT controller 20 into plant operation procedure information which is divided into program generating information necessary for the generation of a program and graphics display information necessary for monitoring. The program generating information is sent to EWS 10 and used for generating a program. The program generating information includes:

(1) identification number of PLC (2) identification code of program module (3) execution level and order of program module (4) interconnection information between program modules.

The plant operation procedure applied to this invention is mainly divided into the following two types:

1) machine handling control (sequential flow chart (SFC))

2) arithmetic control (block diagram)

SFC is a flow chart wherein the control contents of a driving machine are represented by boxes, and the time sequential control flow thereof is illustrated.

In the block diagram, a function of calculating a control signal for a driving machine is represented by a block, and the transfer between blocks of a calculated signal is indicated by an interconnection line.

In SFC, the plant operation procedure is described by a flow chart, and one flow chart is recognized as one module. A block diagram is composed of a set of blocks each representing one function, wherein the identification code of each block, program execution level and order, and signal transfer relationship are defined.

A floppy disk 3 stores list information of driving machines (e.g., motor), sensors, control devices (e.g., valve) and the like connected to each PLC. An example of the contents is shown in FIG. 8. As apparent from FIG. 8, each driving machine, sensor, or control device is given a specific identification code called a device number. The function of an object device can be identified by the device number. The list information includes the name and various ratings of each device. Such information can be picked up in accordance with the device number, such information is inputted to EWS 10 and edited again as list data such as shown in FIG. 9 by a floppy disk read converter unit 10d shown in FIG. 2. EWS 10 performs the main role of generating a program. Packaged program modules are stored in stackers (155A to 155N, 156 in FIG. 2) in EWS 10. EWS 10 receives the plant data (list data) necessary for the generating of a program, and a program generating system 10c generates a load module for each PLC in accordance with the program generating information sent from the CRT controller 20, and generates foreground (FG) information for displaying and monitoring the plant operation procedure which foreground information is stored in a file 10b for respective PLCs 31A to 31N. A load module is loaded in each PLC for the control of a plant. FG information is loaded in PLC 30 which controls CRT 21 to thereby allow to monitor the plant operation procedure on CRT 21. 10e indicates a CRT.

Next, the operation of the system shown in FIG. 1 will be described.

As described above, information regarding the specification of a device (such as motor, sensor, valve, control device) used in a plant is being stored in the floppy disk 3. The information is then transferred to EWS 10. The device specification information stored in the floppy disk 3 is read by the floppy disk read converter unit 10d and held in EWS 10 as a device data base file 10a.

A logic pattern chart (LPC) 51 shows a logic pattern generally used. When it is inputted to EWS 10, the program generating system 10C processes it and stores it in the standard module stacker 156. LPC is a detailed logic chart of a box (block) in the arithmetic block diagram 50, and is registered beforehand by using the keyboard. The detail of the program generating system 10C will be described later with reference to FIG. 2.

The plant operation procedure is inputted to the CRT controller 20 preferably in the form of the sequential flow chart (hereinafter called SFC) 52 and arithmetic block diagram 50, by using the keyboard 5. In the CRT controller 20, while observing CRT 21, an operator inputs an identification code of a module through the keyboard 5 to thereby read the module from the stacker 156 via the system 10C. While observing the read-out plant operation procedure information, the operator enters from the keyboard the program generating information necessary for the generation of a program, i.e., program module execution level and order, signal interconnection or the like. The program generating information is then stored in the program generating information file 20c. Of the plant operation procedure information entered from the keyboard 5, graphics display (picture drawing) information (background information (BG)) necessary for the reproduction of the inputted graphics information on CRT 21 is derived by a processor unit 20a and stored in a plant operation procedure graphics display information file 20d. The graphics information is processed by an on-line monitor processor unit 20b and displayed on CRT 21. The picture 4b to be displayed on CRT 21 is used for monitoring an ordinary operation. This picture is off-line and independent from EWS 10, and is generated from another graphics information entered from the keyboard 5, processed by the on-line monitor 20b in the similar manner as of the file 20d and displayed on CRT 21. This graphics information is stored in a plant operation monitoring graphics display information file 20e. In the files 20d and 20e, there are stored fixed picture information (BG information) and changeable picture information (FG information), i.e., data transmitted from plant controller PLC 30 and displayed changeably, respectively on CRT 21, and the information representative of the positions on CRT 21 where both types of information are displayed. BG information is a fixed picture information which does not change on the screen, and FG information is a changeable picture information on the screen, such as numerals, on-off state and the like. The file 20d is used for monitoring a program, and the file 20e is used for monitoring a plant operation. The information of the file 20c is transmitted to EWS 10 and given to the program generating system 10C. The system 10C generates load modules for plant controllers PLCs 31A to 31N and stores them in the load module file 158. Load modules 158 are stored separately for respective plant controllers PLCs 31A to 31N. Load modules within the file 158 are transmitted to corresponding plant controllers PLCs 31A to 31N via a communication line. The program generating system 10C on the other hand derives, from the program information in the file 20c transmitted from the CRT controller 20, FG information for the display of a changeable picture portion of the plant operation procedure, i.e., the picture signals and the coordinates where the picture signals are displayed, the derived FG information being stored in the plant operation procedure changeable picture information file 10b. The changeable picture information is managed in accordance with the module number of the plant operation procedure inputted from the CRT controller 20. The FG information in the file 10b is transmitted to plant controller (PLC) 30 via a communication line and stored in a memory within PLC 30. Upon reception of a plant operation procedure display request signal transmitted from the CRT controller 20, i.e., upon reception of the module number of the plant operation procedure, PLC 30 sends an instruction to the processor unit 20b of the CRT controller 20 to make the fixed picture information (BG information) of the plant operation procedure stored in the file 20d to be displayed on CRT 21 or 22, and transmits the FG information representative of the coordinates and data of the changeable picture portion (data value or color information representative of a signal on-off state) having the module number in concern. In the above manner, while observing a display on CRT 21 of the CRT controller 20, graphics information for the plant operation procedure is entered from the keyboard 5 to thereby automatically generate a program and the information for monitoring the operation state of the program.

Figure 2:
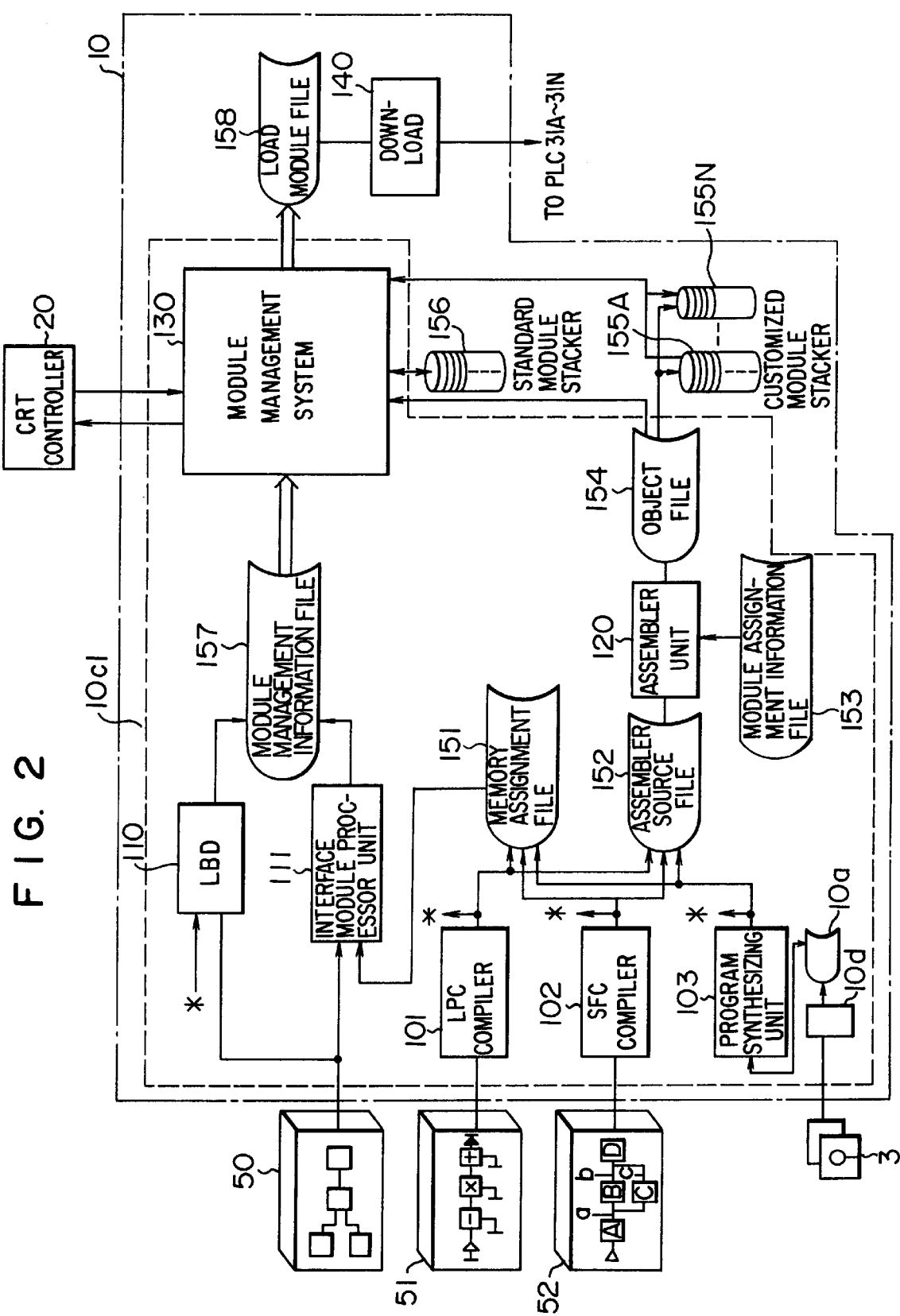
FIG. 2 is a functional block diagram showing the main portion of the engineering work station shown in FIG. 1.

The program generating procedure by EWS 10 is shown in FIG. 2. The outline of the procedure is as follows:

(1) A load module for each PLC is generated by combining and editing packaged customized modules (module management system 130).

(2) In accordance with various list information, an input circuit for a sensor or the like and an output circuit for a motor drive or the like, necessary for plant control, are automatically generated as customized modules (program synthesizing unit 103).

(3) The interconnection relationship between customized modules are represented not by absolute addresses of a memory storing the modules but by the device numbers defined by various list information. After customized modules are combined and edited as a load module, address translation is carried out.

Figure 5:
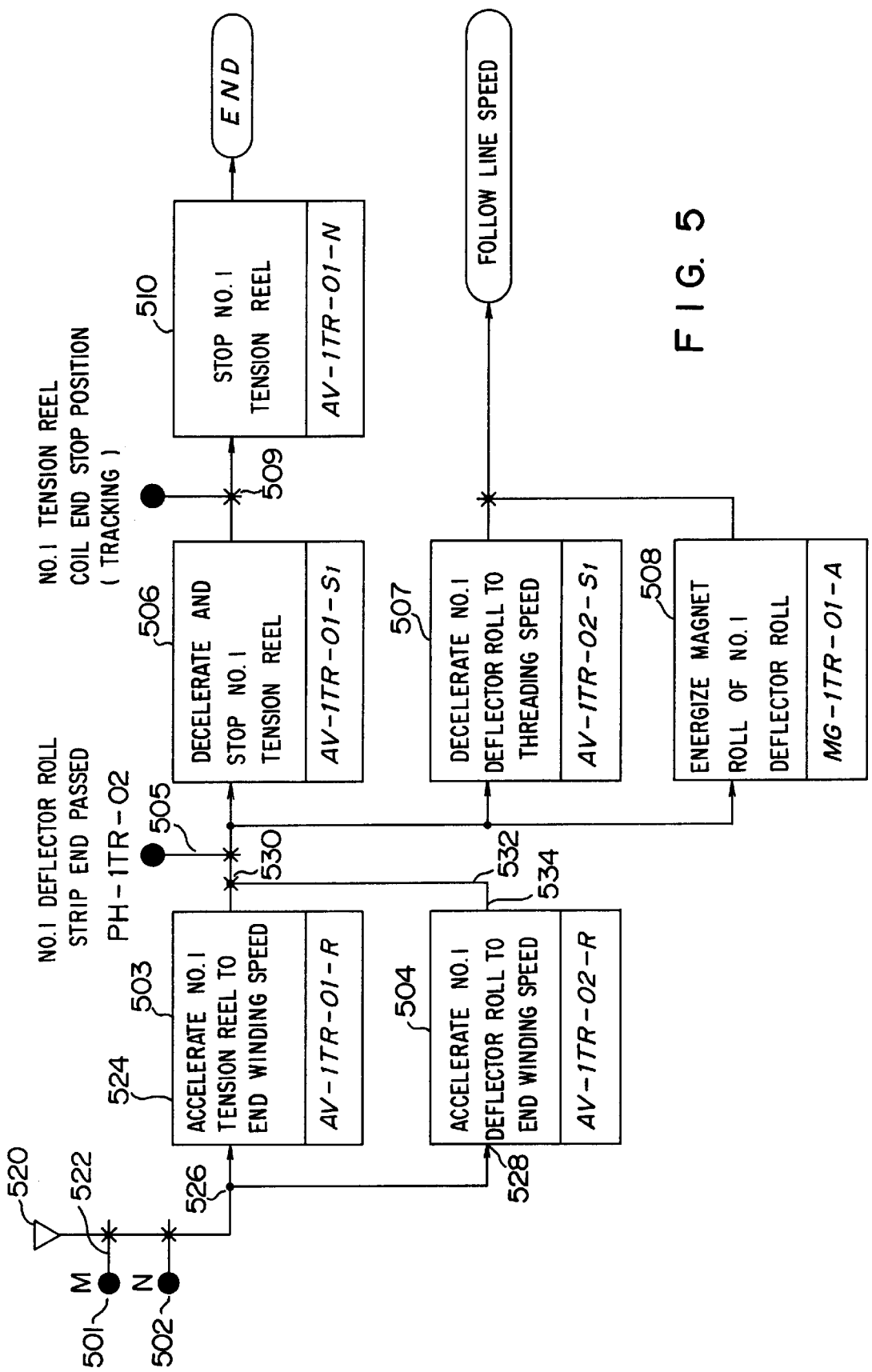
FIG. 5 shows another example of a customized module of SFC.

Referring to FIG. 2, plant operation control specifications 50 and 52 are supplied from the CRT controller 20 as program generating information. The sequential flow chart (SFC) 52 is converted into an assembler source by a dedicated SFC compiler 102 and stored in an assembler source file 152. The dedicated compiler 102 compiles in units of a predefined partition of the chart to generate an assembler source. The assembler source is sent to an assembler 120 to generate an object program which is then stored in an object file 154. This object file is stored as a program module in a module storage area 155 called a module stacker. This module stacker 155 is called a customized module stacker. The customized module stacker 155 is used for storing a packaged program to be generated for each plant. Examples of SFC 52 are shown in FIGS. 4 and 5. An example of the block diagram is shown in FIG. 6E. In the block diagram 50, there are defined identification codes of standard modules (blocks), interconnection relationship between standard modules, and execution level and order of each module. Accordingly, the interconnection of signals between modules can be definitely determined and the execution level and order of each standard module at the time of generating a load module can be definitely determined.

FIG. 5 shows an SFC for a rolling plant system to which the present invention was applied. The control sequence of a rolling machine indicated by modules shown in FIG. 5 will be described with reference to the schematic diagram of an actual rolling system shown in FIG. 10. The rolling system is controlled by corresponding one of PLCs 31A to 31N.

Figure 10:
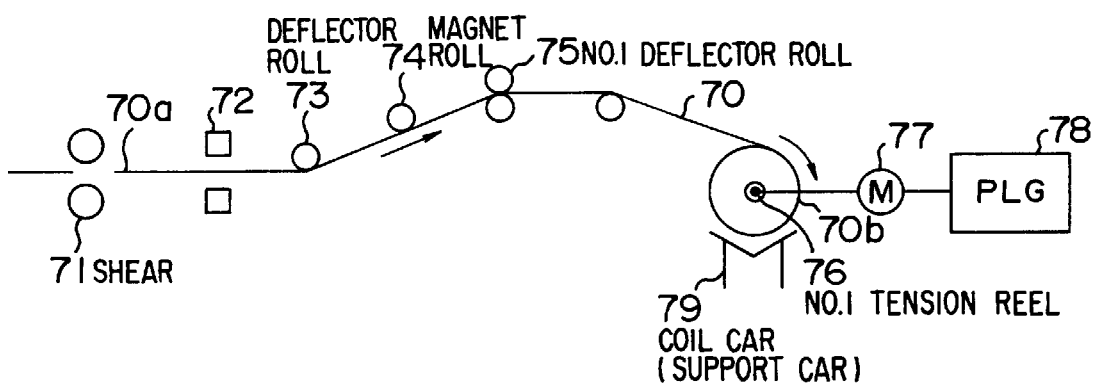
FIG. 10 shows the outline of the structure of a rolling plant system applicable to this invention.

Referring to FIG. 10, reference numeral 71 represents a shearing machine for shearing a rolled material 70, 72 a photosensor for detecting the end 70a of the sheared material, 73 a deflector roll, 74 a magnet roll, 75 a No. 1 deflector roll, 76 a No. 1 tension reel, 77 a driving motor for the reel 76, 78 a pulse generator for generating a pulse in synchronism with the rotation of the motor 77, and 79 a coil car for transporting rolled material wound about the reel 76. These shearing machine, sensor, rolls, reel, motor and the like are controlled by corresponding one of PLCs (31A to 31N) in accordance with the module shown in FIG. 5.

Referring to FIG. 5, an AND interlock at 501 indicates that a drive signal is outputted to the shearing machine 71 as an AND condition. An AND interlock at 502 indicates that a shearing end completion signal is inputted from the shearing machine as an AND condition. After completion of shearing by the shearing machine, the tension reel is accelerated to the revolution rate necessary for winding up the rolled material in a coil, as shown in the box 503. At the same time, as shown in the box 504, the deflector roll 75 is also accelerated to the revolution rate necessary for winding up the rolled material.

Next, as shown by an AND interlock 505, when the end 70a of the sheared material is detected with the photosensor as an AND condition, the operations indicated in the boxes 506 to 508 are executed at the same time. Namely, the No. 1 tension reel 75 is decelerated, the No. 1 deflector roll 75 is decelerated to a threading speed, and the magnet roll 74 is energized.

Upon operations of the boxes 507 and 508, the deflector roll 75 is caused to follow a line speed. Upon operation of the box 506, tracking is carried out by the tension reel 76 so as to stop the rolled material wound in a coil at a stop position 70b. Namely, when the number of pulses generated by the pulse generator 78 after the end 70a is detected by the photosensor 72 reaches a predetermined value, a signal indicating such effect is inputted to the AND interlock 509 as an AND condition. Then, the tension reel 76 is caused to stop by the box 510 and the sequence is terminated.

Next, in accordance with the array information between customized modules (block diagram, SFC) for PLC sent from the logic block diagram (LBD) 110 and in accordance with the interconnection information between customized modules sent from an interface module processor unit 111, the system 30 reads corresponding customized modules from the stacker 155 to generate a load module for reach PLC and store it in the load module file 158. If the description is made in terms of computer, the customized module stacker corresponds to a relocatable object program group, and the module editing 130 plays the role of a linker to obtain absolute addresses of the relocatable object program group. With conventional programming tools for PLC, it is common that inputs are directly transformed into a load module and that there is no thought of object transformation (source program). Accordingly, language becomes like machine language. In addition, if a common program is used several times, it is formed as a sub-routine, or the same circuit is required to be inputted corresponding times by means of a programming tool. According to the present invention, a common logic is prepared beforehand as a standard module of an object program, and a program specific to each plant is also converted once into an object program module and stored as a customized module. A set of standard modules and customized modules are eventually arranged and combined to generate a load module.

The structure of the program generating system 10C shown in FIG. 1 will be described with reference to FIG. 3C.

Figure 3A:
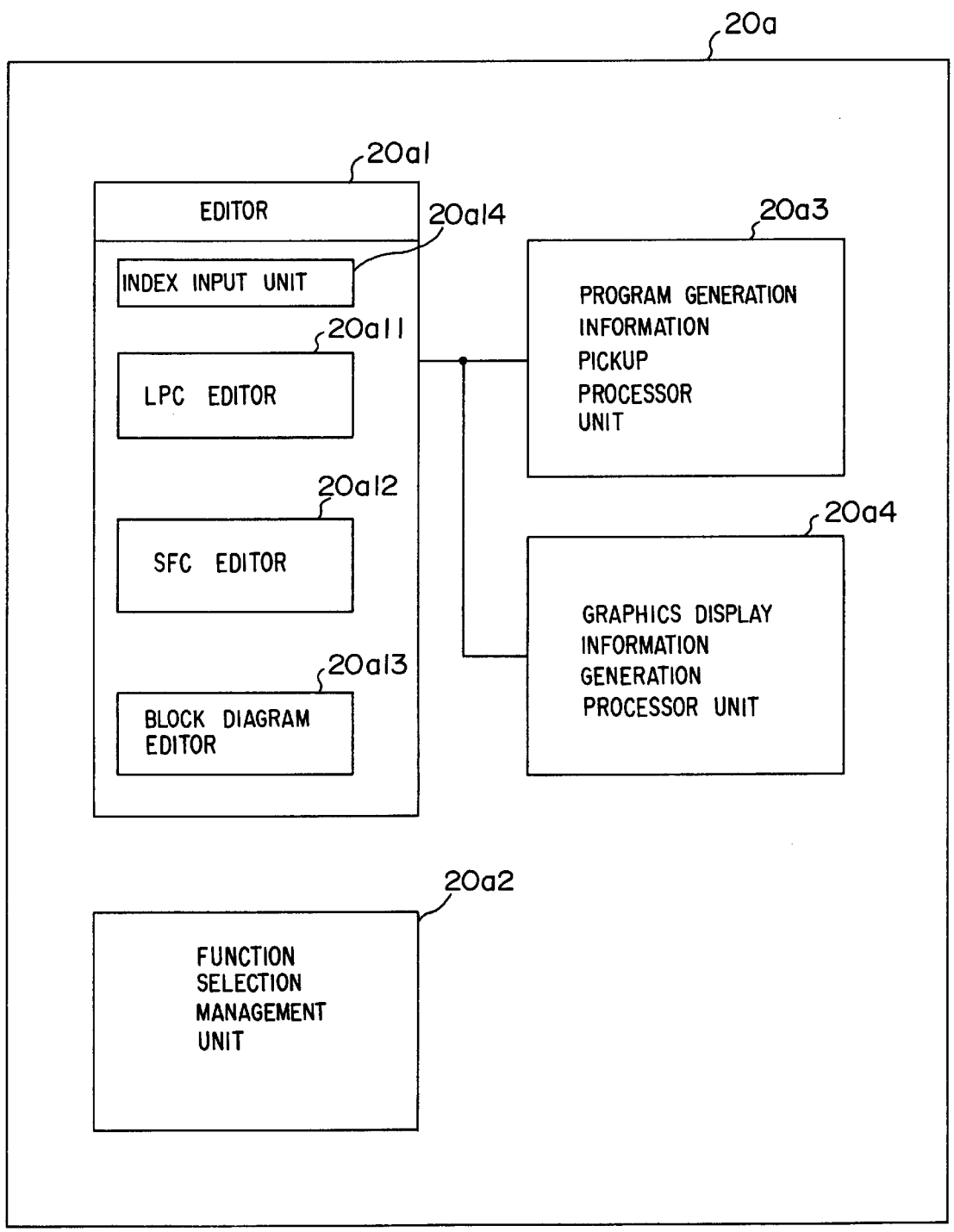
FIGS. 3A and 3B are functional block diagrams showing the main part of a CRT controller.
Figure 3B:
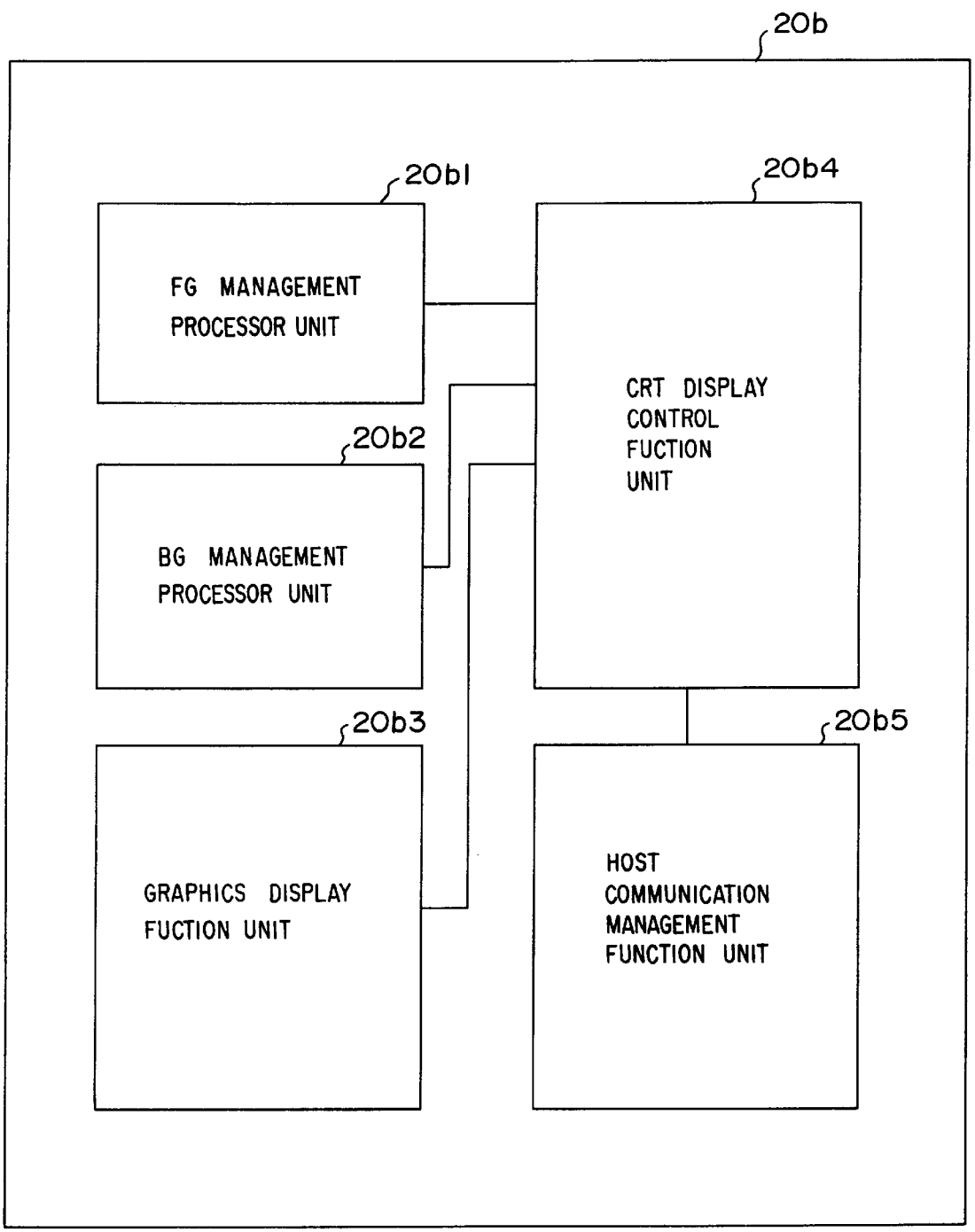
Figure 3C:
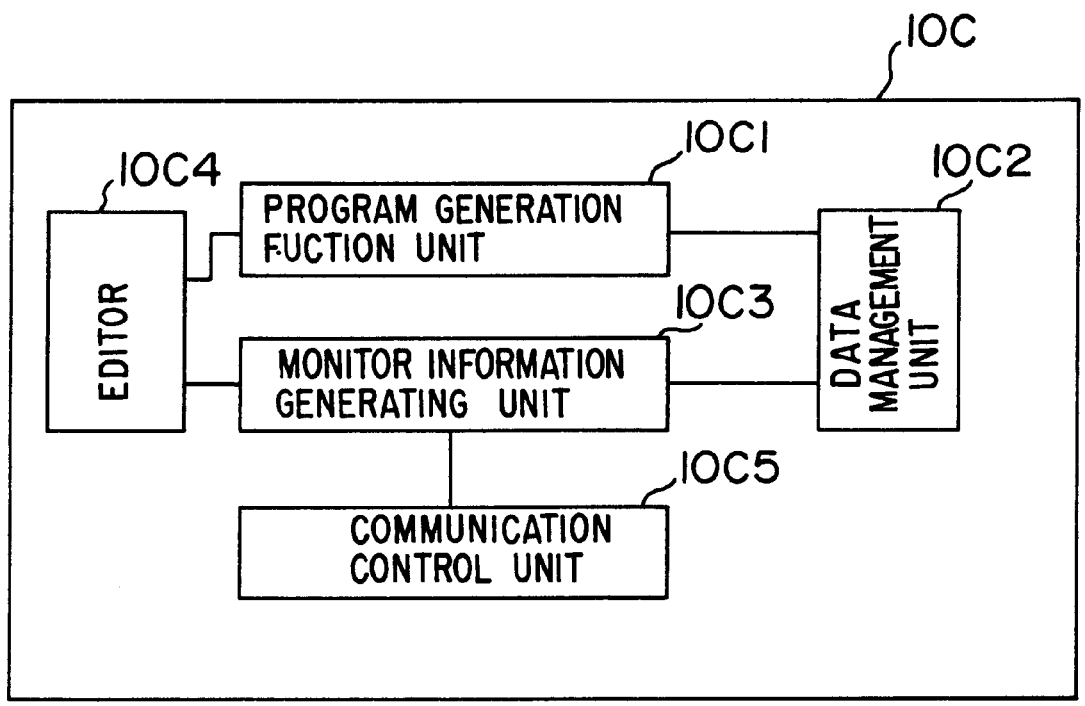
FIG. 3C is a functional block diagram of the program generating system within the engineering work station.

In FIG. 3C, 10C4 represents an editor having the same function as that of the processor unit 20a. 10C1 represents a program generating function unit the detail of which is shown in FIG. 2. 10C3 represents a monitor information generating unit which derives, from the entered graphics information, FG and BG information and stores them separately in a file 10C3a. While providing correspondence between the device number and the memory address in PLC, the information is generated which is used for PLC for the CRT control. 10C2 represents a data management unit which manages data read/write with respect to the file within the system 10, and 10C5 represents a communication control unit which transfers data to and from the CRT controller 20.

The plant operation procedure information processor unit 20a of the CRT controller 20 will be described with reference to FIG. 3A.

20a2 represents a function selection management unit which follows an instruction entered from the keyboard to select an index information mode or an editor mode, respectively used by the editor 20a1.

20a3 represents a program generating information pickup and processor unit which derives, for each module from the graphics information entered from the keyboard, data necessary for the generation of a program, instruction word, instruction word train, and module execution level and order, and stores them in the program generating information file 20c.

20a4 represents graphics display information generating and processor unit which separately derives the FG and BG information from the graphics information generated by the editor and stores them in the graphics display information file 20d.

The editor 20a1 has a graphics display and data input function (a function to interface between the keyboard 5 and CRTs 21 and 22 and provide a graphics display image) and has three modes for LPC editor 20a11, SFC editor 20a12 and block diagram editor 20a13, and an index input mode (for inputting execution level and order).

The LPC editor 20a11 is used mostly for generating a standard module (i.e., for generating a detailed logic of each block in the block diagram as a standard module), and also for providing a graphics display of a block diagram and a customized module not expressed by SFC (i.e., expression of arithmetic operation, interlock, and the like).

The SFC editor 20a12 is an editor for providing a graphics display of SFC, and the block diagram editor 20a13 is an editor for providing a graphics display of a block diagram.

Next, the on-line monitor processor unit 20b will be described with reference to FIG. 3B. 20b1 represents an FG management processor unit which manages the FG data (coordinates and types of data) to be monitored and displayed on CRT 21 in units of each display screen.

20b2 represents a BG management function unit which manages the fixed picture information (BG information) to be monitored and displayed on CRT 21 in units of each display screen.

20b3 represents a graphics display function unit which has a function to provide a graphics image for monitoring a plant operation, inputs the FG and BG information and stores them in the file 20e.

20b5 represents a host communication management function unit which has a communication processing function with respect to a host computer (PLC 30 for the CRT control). Specifically, it transmits an input from the keyboard to the host computer, and sends the FG data from the host computer to the CRT display control function unit during monitoring.

20b4 represents a CRT display control function unit which provides a screen display during an on-line operation by using the FG and BG information in accordance with an instruction from the host computer, and provides a screen display during an off-line operation in accordance with an instruction from the graphics display function unit.

Next, the procedure of generating a plant operation procedure program of this embodiment will be described with reference to the flow chart shown in FIG. 11.

First, modules are generated and registered in the stacker for each of PLCs 31A to 31N (step 1102). Modules to be generated in this case include standard modules (49, 51 in FIG. 1) and customized modules (50, 52). Standard modules of high level language are generated beforehand and stored in the standard module stacker 156. In accordance with such standard modules, customized modules of high level language are generated and stored in the customized module stacker 155. As such modules, there are SFCs shown in FIGS. 4A to 4C and FIG. 5, and an arithmetic operation block diagram shown in FIG. 6E.

The procedure for generating these modules are executed in accordance with the flow charts shown in FIGS. 12 to 15 to be described later. The style of a program generated at this stage is constructed of instruction words corresponding to the graphics information, as shown in FIGS. 4B, 5 and 6E. The generated module is added with an identification code which is the PLC number of the module in concern, or given with an identification code, i.e., the module number, which is the name (device number and the like) affixed to the data used by the module or the data to be outputted, thereby allowing easy access to the module and easy discrimination from other modules.

It is preferable that the module generated in the above manner by means of the keyboard is sent from the CRT controller to EWS 10 and temporarily stored in the stackers 155 and 156.

Next, upon designation of the module number from the keyboard, a customized module is called from the stacker 155 to the CRT controller 20 via the module management system 130 to display it on CRT 21 (step 1104). Then, as shown in the flow charts of FIGS. 13 and 14, the manner how the customized module is operated is designated, i.e., the execution level and order of the module is designated (steps 1104 and 1106). Each of generated customized modules is stored in the customized stacker corresponding to PLC in concern (step 1106).

The steps 1102 to 1106 are repeated for each PLC.

Each customized module is therefore set with the execution level and order as well as its graphics information.

In this manner, instruction words corresponding to the graphics information as shown in FIGS. 4B, 5 and 6E are stored for each module. By reading the instruction words, it becomes possible to display the graphics information as well as the execution level and order on CRT 21 in the form of picture image.

Generating a module in the editor mode as described above may be carried out either by the CRT controller 20 or EWS 10 on condition that the generated results are supplied to EWS 10.

Next, a customized module is read from the stacker 155 via the system 130 and compiled to generate a source program for PLC corresponding to the module. Thereafter, it is further assembled into an object program and stored again in the stacker 155 (step 1110). Stackers 155A to 155N are provided in correspondence with PLCs 31A to 31N.

The compiling and assembling procedure will be described with reference to FIG. 2.

First, upon designation of a customized module by entering the module number from the keyboard, a corresponding stacker 155 is accessed via the information processor unit 20a, file 20c, and module management system 130 within the system 10 to thereby read the customized module in concern (instruction words corresponding to the graphics information).

It is to be noted that an identification (ID) symbol is added after the module number. This identification symbol is used for the discrimination of compiling stages whether the module stored in the stacker 155 is instruction words or object program corresponding to the graphics data. Accordingly, by entering this identification symbol together with the module number from the keyboard, it is possible to read the module at a desired compiling stage.

The term "graphics information" herein used means the information representative of the control flow, function and signal flow, and execution level and order as shown in FIGS. 4B, 4C, 5 and 6E. The graphics information is used for recognizing the sequence in the form of picture image on CRT 21.

If the graphics information of the read-out module is SFC 52, the module is converted into an assembler source by the SFC compiler 102 and stored in the assembler source file 152.

The assembler source is thereafter transformed into an object program of intermediate language not addressed and stored in the object file 154, and then stored in the same stacker 155 from which the program module was read. A module assignment information file 153, which will be later described in detail with reference to FIG. 16B, definitely addresses each module, for example, such that the start address of the object program module is assigned 4000, its input start address M400 and its output start address M600.

Similarly, if the graphics information of the module read from the stacker 155 is a logic pattern chart LPC 51, the module is compiled by the compiler 101 into an assembler source and to an object program which is in turn stored in the same stacker 155.

The list information read from the file 10a is synthesized into a standard circuit corresponding to the device number by the program synthesizing unit 103, and compiled into an object program which is in turn stored in the stacker. The compiling and assembling procedure is executed for all modules (steps 1110 and 1112).

Next, modules are edited for each PLC, LPC for each box of the plant operation control specification (arithmetic operation block diagram) 50 is stored beforehand as an object program in the stacker 156 by means of the LPC compiler 101, assembler unit 120 and the like. Therefore, by using the object program previously stored, a load module can be generated without compiling. Accordingly, LBD 110, i.e., the module array definition information (information on module execution level and order) is directly supplied to the module management information file 157. Of the outputs from the compilers 101 and 102 and the program synthesizing unit 103, the information on the module execution level and order is also supplied to the file 157 as LBD.

In accordance with a module assembler source outputted from the program synthesizing unit 103 and compilers 101 and 102, the memory assignment file 151 generates the file of input/output signals (device numbers) and sends them to the interface processing unit 111. In accordance with the file 151 and plant operation control specification 50, signals between modules are related to each other and a list of interconnection information between modules is generated and given to the file 157.

In accordance with the information of the file 157 (such as module array and interconnection relationship), the module management system 130 combines a group of object programs within the stacker 155 as a set of programs and edits it to obtain a load module having an absolute address which is then stored in the load module file 158.

Specifically, a load module set for each PLC is edited, i.e., address translated. This processing will be later described with reference to the flow charts shown in FIGS. 16A to 16C and FIG. 17.

The load module thus edited is down-loaded or stored in a program memory 32*a* of one of PLCs 31A to 31N corresponding to the PLC identification code.

Figure 20:
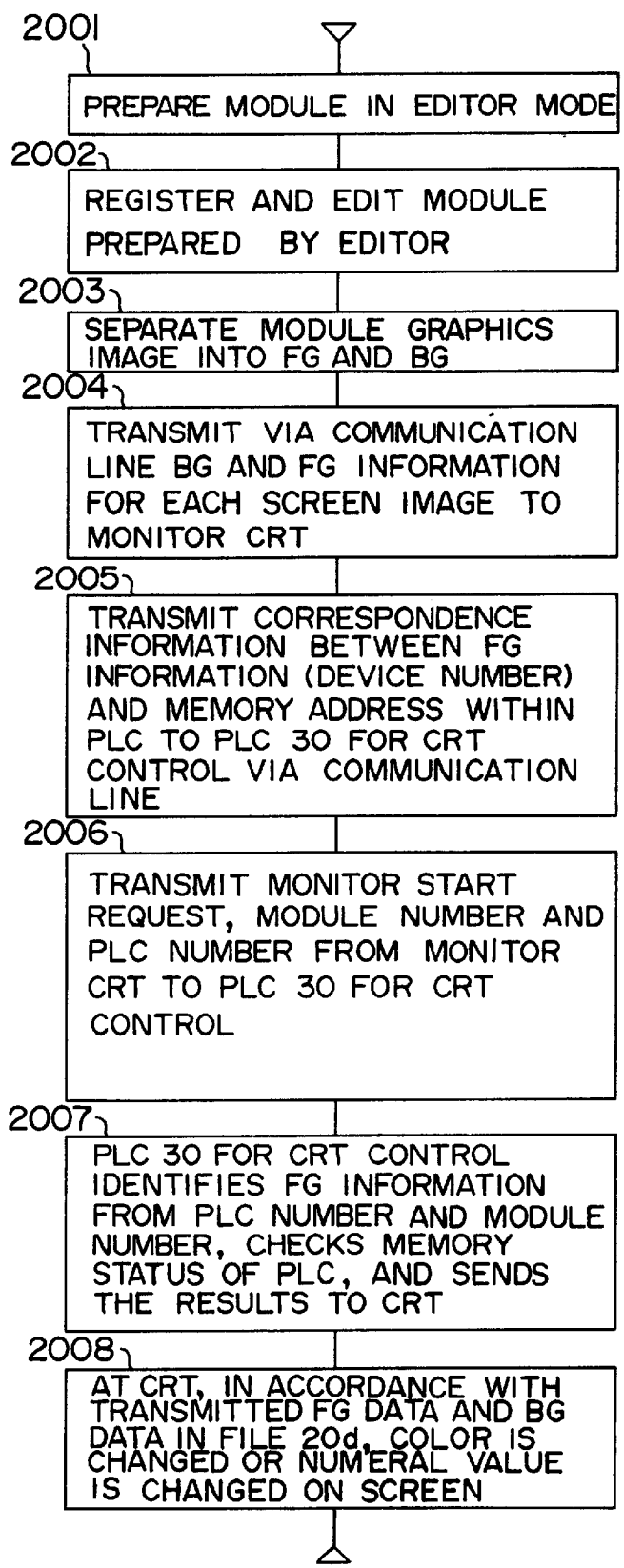
FIG. 20 is a flow chart illustrating the procedure of monitoring a module.

After completion of module editing, the graphics information for each module is read from the stacker 155 and separated into FG (foreground) information and BG (background) information to be stored in the FG file 10*b* and stacker 155 and the like. The processing which allows to monitor the plant operation procedure (each module) is executed at step 1114 by the monitor information generating unit 10C3. The detail of monitoring will be described later in detail with reference to the flow chart shown in FIG. 20.

According to the present invention, the final address information for each module is not added to a source program after compiling, but it is added when the module is edited after generating an assembled object program as described above. Thereafter, modules are arrayed in suitable positions to download them. Accordingly, as will be described with FIGS. 16A to 16C and FIG. 17, arraying modules is very easy, and address translation at the time when a module is modified or changed is also easy.

Next, the procedure of setting a plant operation procedure SFC as a module will be described with reference to the flow chart of FIG. 12 taking as an example the procedure of setting a customized module shown in FIG. 4B. First, upon selection of the editor mode from the keyboard 5, the CRT controller 20 activates the program generating system 10C (step 1201). In the sequence shown in FIG. 4, module setting is effected from the left to the right as viewed in FIG. 4.

When the number of the customized module PLC to be set is entered and the SFC input mode is selected by the keyboard, the SFC editor 20*a*12 of the plant operation procedure information processor unit 20*a* is activated so that it becomes possible to read a small module for SFC programming stored in the standard module stacker 156 (step 1202). As small modules for SFC programming, for example, there are those shown in FIG. 4A. These small modules are stored beforehand in the file 20*c* via the information processor unit 20*a* from the keyboard, and thereafter the are stored in the stacker 156 via the system 10C.

Next, a cursor is moved to the start symbol display position on the CRT screen (step 1203). When a key code (e.g., 001) corresponding to the start symbol (▷—) 402 is entered, the start symbol is read from the stacker 156 and displayed on CRT 21 via the monitor processor unit 20*b* (step 1204). The key code entered from the keyboard is stored in the file 20*c* while referencing it to the coordinates on the screen of CRT 21.

In the similar manner, the cursor is moved (step 1205) and a key code (e.g., 002) corresponding to a box symbol (☐) 404 is entered from the keyboard to display the box symbol. The key code is stored in the file 20*c* while referencing it to the screen coordinates (step 1206).

The execution order of each instruction word (key code) is determined by designating with the cursor the position where the instruction word designating a module is to be entered.

Next, in order to specify the function of the box symbol, the device number A is entered from the keyboard. The device number is stored in the file 20*c* and displayed on CRT 21 (step 1207). The entered device number is present in the list information shown in FIG. 9 which is stored beforehand in the file 10*a* from the floppy disk 3. When the device number shown in FIG. 4B is entered, the control logic indicated at A in FIG. 4C is designated. The control logics A, B and the like shown in FIG. 4C are being stored in the stacker 156 each as one standard module.

The device number is determined independently for each plant. The interconnection relationship of signals between modules is defined by using the device number.

When the cursor is moved (step 1208) and an AND interlock ($\mathfrak{L}$) 4006 representative of an AND condition and the device number corresponding to a signal name a are entered from the keyboard, the AND interlock and signal name ($\mathfrak{L}^a$) is displayed. The key code, device number and screen coordinates are stored in the file 20*c* (step 1209).

The device number corresponding to the signal name is present in the list shown in FIG. 9, and is determined independently for each plant. The interconnection relationship of signals between modules is defined by using the device number.

Next, in the similar manner, when the cursor is moved further and the device number corresponding to a box symbol B is entered from the keyboard, the box symbol is displayed (steps 1210 to 1212). Thereafter the cursor is moved and the device number corresponding to the signal name b is entered from the keyboard (steps 1213 and 1214).

Next, the cursor is moved and an end symbol (—◁) 408 is entered from the keyboard to complete the setting of the SFC module (steps 1215 and 1216). In this manner, the SFC customized module shown in FIG. 4B and constructed of a combination of small modules is completely set. The completed module is shown in FIG. 4C.

The module number of the next SFC module to be set is entered from the keyboard (step 1217). The module number and the key code for the SFC customized module are then stored in the customized module stacker 155 from the file 20*c* via the module management system 130 of EWS 10 (step 1218).

In this manner, an SFC module for each function is stored in the stacker 155. The module number is used as an identification code of the module when it is to be stored in or read from the stacker 155.

The above description has been directed to the method of setting a customized module. The standard module such as modules A and B shown in FIG. 4C may be set in the same manner. Such standard modules are stored in the standard module stacker. The standard and customized modules may be set from a keyboard (not shown) of EWS 10.

Next, the method of setting an execution level and an execution order within the same level, of SFC customized modules set in the above manner will be described with reference to the flow chart shown in FIG. 13.

First, an INDEX information input mode is set from the keyboard. A PLC number is designated and an SFC customized module number is entered from the keyboard. Then, the module corresponding to the module number is read from the stacker 155, stored in the file 20c via the module management system 130, and displayed on CRT 21 via the processor unit 20a, file 20d and monitor processor unit 20b.

Next, when the task level of the read-out module, e.g., the activation period thereof, is entered from the keyboard, it is displayed on CRT 21 and stored in the file 20c.

If there is another module having the same execution level, the execution order of modules having the same execution level is entered from the keyboard, and it is displayed and stored.

After setting the execution level and order, they are stored via the system 130 into the customized stacker 155. This setting operation may be executed immediately after step 1216 shown in FIG. 12.

The SFC module shown in FIG. 4B is a sequence having no branch. Next, the procedure of setting a sequence having branches as shown in FIG. 5 will be described with reference to the flow charts shown in FIGS. 14A and 14B. In the sequence shown in FIG. 5, as the information within a box, there are displayed the device number and the corresponding list information within the file 10a. In the sequence, setting is effected from the left to the right and from the upper to the lower as viewed in FIG. 5.

First, the SFC input mode is selected from the keyboard to allow to read small modules stored in the stacker 156 (step 1401).

Next, a start symbol (▷—) 520 is entered from the keyboard (step 1402), an AND interlock (•-×) 522 is entered from the keyboard (step 1403), and the device number of the AND interlock, e.g., M is entered from the keyboard (step 1404).

In the similar manner, an AND interlock and its device number, e.g., are entered from the keyboard (steps 1405 and 1406).

Next, a box symbol (☐) 524 and its device number AV-1TR-01-R are entered from the keyboard (steps 1407 and 1408). The designated device number is present in the list information shown in FIG. 9 and stored in the file 10a. The character information in the box shown in FIG. 5 is present in the list information shown in FIG. 9 corresponding to the device number, the character information indicating the control contents (standard circuit corresponding to the device number and synthesized by the program synthesizing unit 103) for driving machine s and the like. For example, for the device number in the box 503, AV stands for a variable induction motor, 1TR for No. 1 tension reel, 01 for the motor number, and R for motor operation.

Next, a branch instruction is entered from the keyboard (step 1409). The positions of a crossover point (⊤) 526 and end point (→) 528 are designated with the cursor and entered from the keyboard (step 1410). A box symbol is entered from the keyboard to display the box 504 at under the box 503, and the device number AV-1TR-02-R for the box is entered (steps 1411 and 1412). Next, an instruction for an AND confluence 530 is entered from the keyboard, and the positions of a cross point (⊥) 532 and end point (-) 534 are designated with the cursor and entered from the keyboard (steps 1413 and 1414). An AND instruction 505 is entered (step 1415), and the device number corresponding to an AND input, e.g., PH-1TR-02, is entered from the keyboard (step 1416).

In this device number, PH stands for a photocell, 1TR for No. 1 tension reel, and 02 for No. 2 photocell.

In the above manner, boxes 506 to 510 and AND input 509 and the like are entered from the keyboard to complete the module shown in FIG. 5 (step 1417).

Next, the execution level and order of the completed module is set (step 1418). This module as a customized module is stored in one of the customized module stackers 155A to 155N via the system 130 (step 1419).

Figure 7:
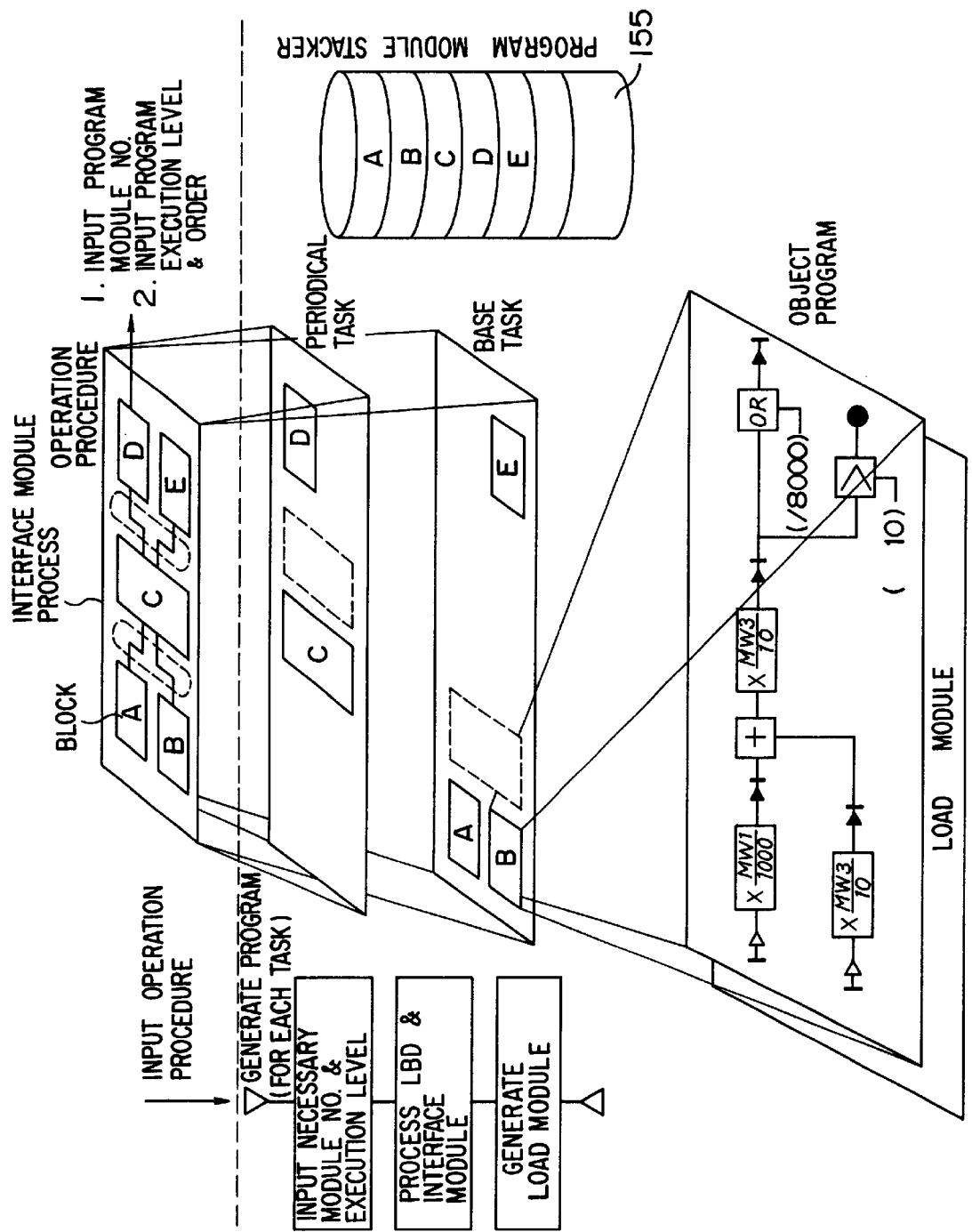
FIG. 7 shows the concept of generating a load module for a block diagram.

An example of programming for a block diagram will be described with reference to FIG. 7. For a given plant operation procedure, the number of a program module for realizing a function is first entered. A PLC constituting a block has program types including a period task and a base task. This program type is entered, and then the array of programs of the same program type is entered from LBD. Accordingly, an object program module (e.g., PLC object program) for each block is picked up from the program module stacker 155, and a necessary number of modules for each task type are arrayed in position. Next, the addresses of module input/output are determined in accordance with the block interconnection information from the file 157, and a load module is eventually generated.

Each block in the block diagram is related to an object program logic diagram 51 stored in the stacker 155 by the device number assigned to the block.

Figure 15A:
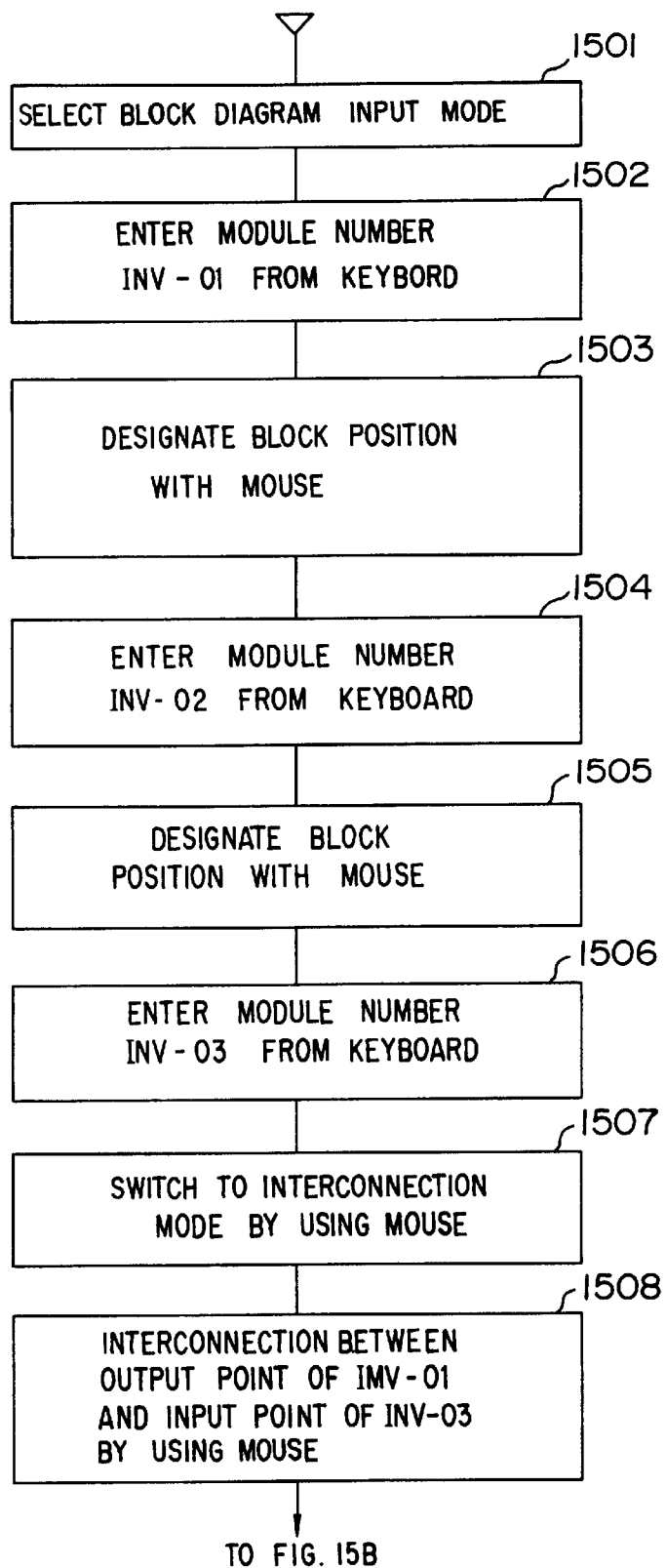
FIGS. 15A and 15B are flow charts showing the procedure of generating the block diagram shown in FIG. 7.
Figure 15B:
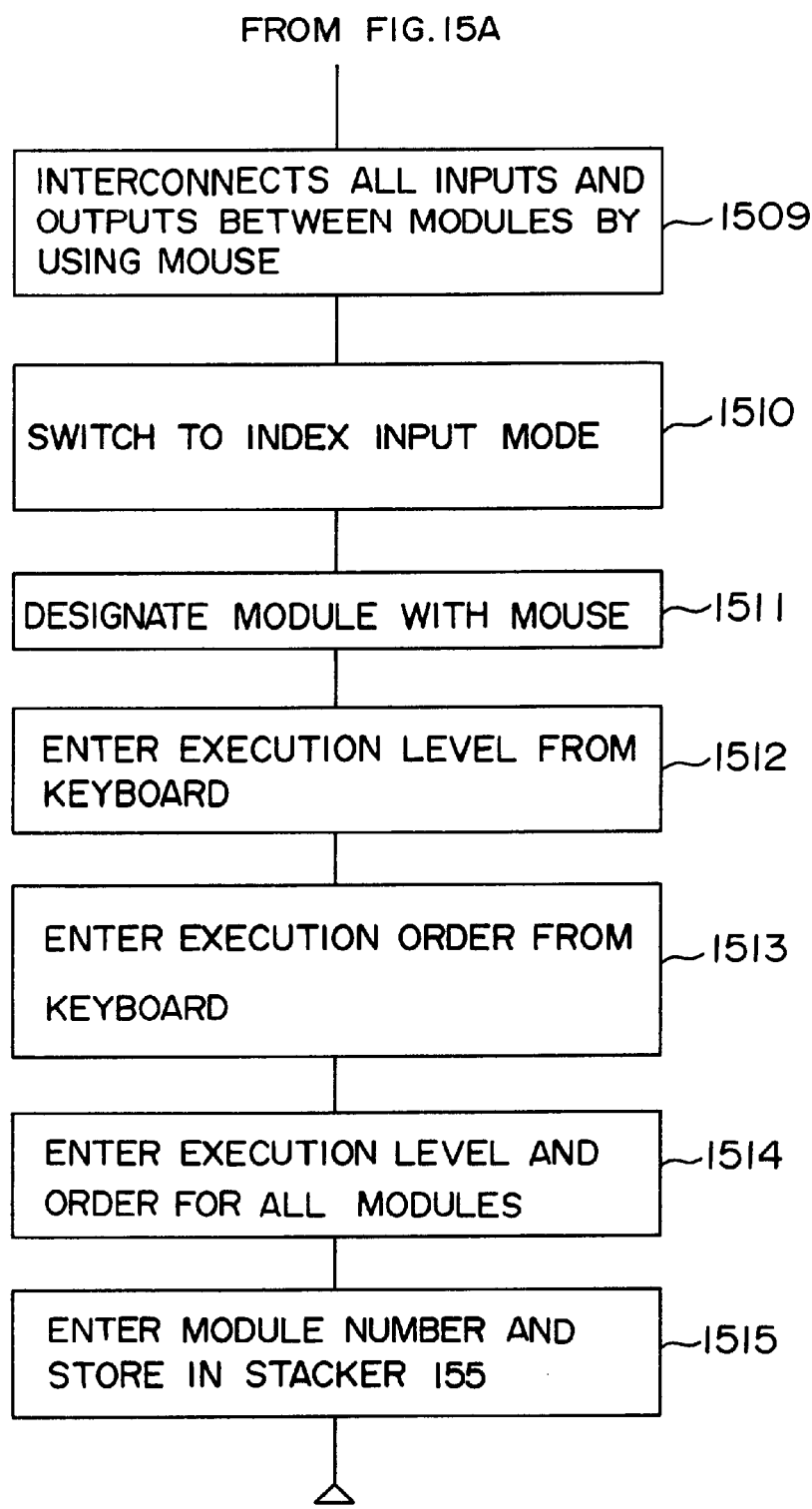

Next, the procedure of setting as a module an arithmetic operation block diagram, e.g., such as shown in FIG. 6E, as the plant operation procedure programmed as above, will be described with reference to the flow chart shown in FIG. 15.

Each arithmetic operation block is stored beforehand as a standard module in the stacker 156 as shown in FIG. 6A. The method of setting a standard module is as follows. First, the block diagram input mode is selected from the keyboard to activate the block diagram editor 20a13. A key code corresponding to a block is entered so that a block symbol (⊟) shown in FIG. 6D is read from the stacker 156, displayed and stored in the file 20c. Next, the device number, e.g., INV-01, is entered to display it within the block as shown in FIG. 6A and thereafter stored in the stacker 156 via the system 130. INV stands for an inverter in this embodiment.

Next, by using standard modules of arithmetic operation blocks set in the above manner, the arithmetic operation block diagram as a customized module shown in FIG. 6E is generated in accordance with the following procedure.

First, the PLC number is entered from the keyboard, the editor mode and block diagram input mode are selected, and the PLC number of a customized module to be set is entered from the keyboard (step 1501). Next, the module number INV-01 is entered to read the standard module corresponding to the module number from the stacker 156 and display it (step 1502). Next, the position of the next block (block under the block INV-01 shown in FIG. 6E) is designated with the mouse 6, and the module number INV-02 of the block is entered from the keyboard and displayed (steps 1503 and 1504). In the similar manner, the next standard module INV-03 is displayed (steps 1505 and 1506).

Next, the mode is switched to the interconnection mode by using the mouse 6 (step 1507). The output point of the module INV-01, e.g., output point 1, and the input point of the module INV-03, e.g., input 1, are interconnected together on the screen of CRT 21 by using the mouse (steps 1507 and 1508).

In the similar manner, all inputs and outputs between modules are interconnected (step 1509). In FIG. 6E, the number within the parentheses ( ) at the input and output of each interconnection line is the sheet number of a customized module of another block to be connected thereto and stored in the stacker 155.

In each standard module such as INV-01, the device number (signal name) of a list in the file 10a corresponding to the input and output is set beforehand as shown in FIG. 6B, and a logical pattern chart LPC 51 showing the relationship between the inputs 1 and 2 and output 1 is set beforehand as shown in FIG. 6C. These device name and logical pattern chart LPC are set when the standard module is set.

Next, the mode is switched to the INDEX input mode, and the module number, e.g., INV-01, is entered from the keyboard (steps 1510 and 1511). The execution level, e.g., activation period B, of the designated module number is entered from the keyboard, and if there are a plurality of modules having the same activation period, the execution order of the module numbers are entered from the keyboard (steps 1512 and 1513). These setting contents are displayed on CRT 21 and stored in the file 20c. After completion of key input of the execution level and order of all standard modules, the module number (sheet number) of the block diagram shown in FIG. 6E as a customized module is entered from the keyboard, and stored in the customized stacker (steps 1514 and 1515).

The customized module shown in FIG. 6E is therefore constructed of three standard modules, wherein the modules INV-01 and INV-02 have the same execution level and the module INV-01 has a higher priority than the module INV-02.

Next, how the program is edited (step 1114 in FIG. 11) will be described with reference to FIGS. 16A to 16C and FIG. 17.

Figure 16A:
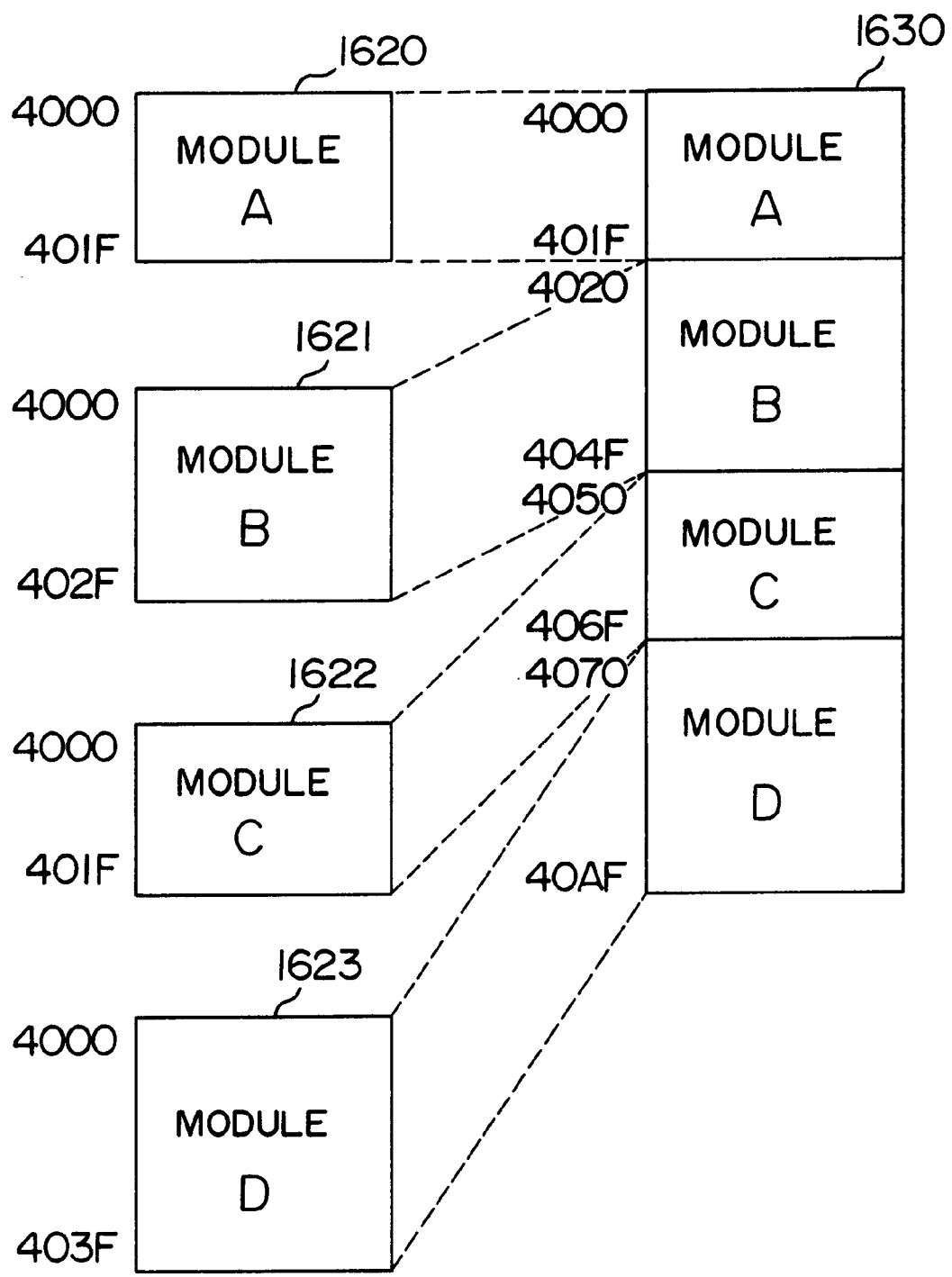
Figure 17:
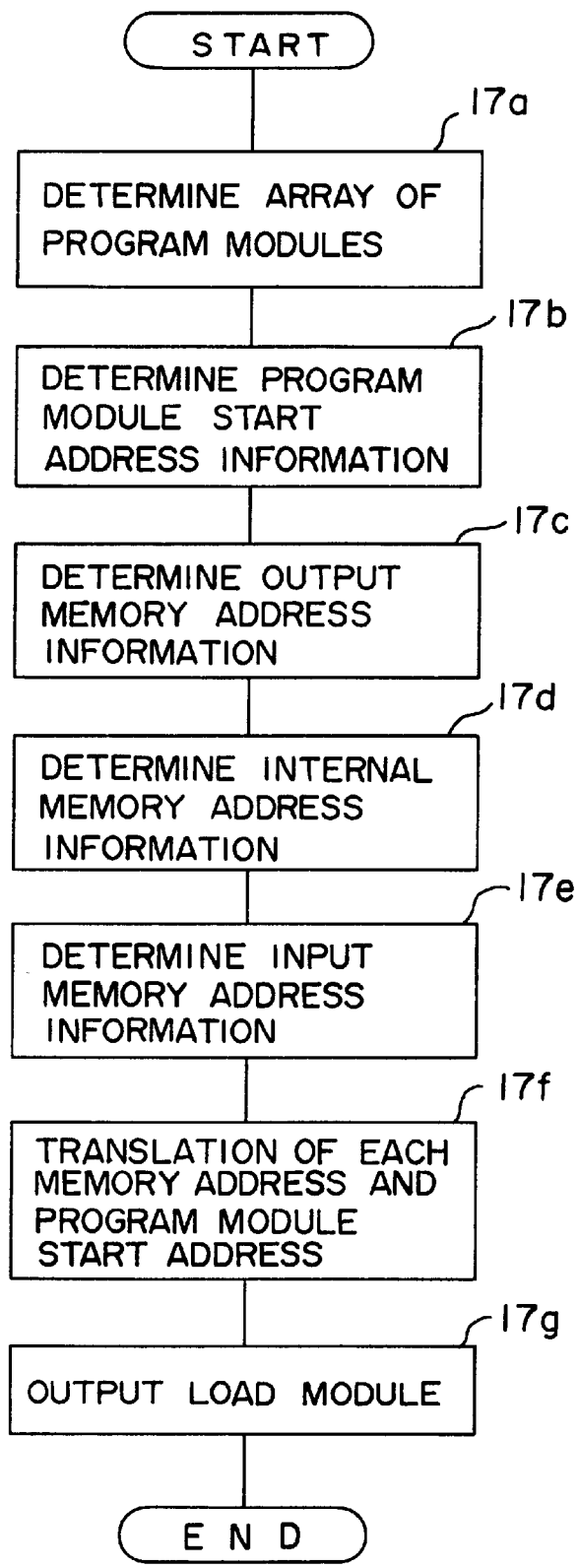
FIG. 17 is a flow chart showing the procedure of editing modules.

FIG. 17 is a flow chart showing module editing processes. FIG. 16A shows how the start address of each module changes with loading start address information determined at step 17b. FIGS. 16B and 16C show how the memory address of each module changes with memory address change information determined at steps 17c and 17e.

The flow of processes by the module management system 130 will be described with reference to FIG. 17.

First, at step 17a the program module array is determined in accordance with the module array information inputted from LBD 110, i.e., in accordance with the serial numbers determining the module array. Next, at step 17b the change information of the start address of each program module is determined in accordance with the start address of each module (in this embodiment, address 4000 in hexadecimal) and the capacity of each module. Of input and output memory addresses of each module, the output memory address is first determined at step 17c. Specifically, the device numbers at outputs of a module are sequentially assigned addresses in the order starting from the module at the earlier stage in the module array. For example, as shown in FIG. 16C, the output device numbers d, e, f, and a of the module A are sequentially assigned addresses M001, M002, ... At step 17d internal memory address information of each module is determined. Upon assignment of an output memory, the internal memory is located at the vacant area after the output memory. In accordance with the linkage with the output memory, input memory address information is determined at step 17e. The already assigned output memory address of a module is used as the input memory address of another module, rather than by using the interconnection information between modules supplied from the interface module processor unit 111, i.e., rather than by using the information regarding which output memory of what module is used as the input memory address. For example, the input device number a of the module A is assigned the same address M005 of the output memory device number a of the module B. At step 17f, the address of each memory is translated with respect to the start address of the program module. Lastly at step 17g a load module is outputted.

The method of determining the start address of the program module will be described with reference to FIG. 16A.

Consider as an example the procedure composed of four modules A, B, C and D. The addresses of the module A 1520 are from 4000 to 401F, those of the module B 1621 are from 4000 to 402F, those of the module C 1622 are 4000 to 401F, and those of the module D 1623 are from 4000 to 403F. These modules are stored in the customized stackers at the corresponding addresses. The modules A, B, C and D are arrayed in this order by the module editing processes and the start addresses of the modules are determined in accordance with the capacity of each module.

In the above example, as shown at 1630 in FIG. 16A, the addresses of the module A are from 4000 to 401F, those of the module B are from 4020 to 404F, those of the module C are from 4050 to 406F, and those of the module D are from 4070 to 40AF.

The method of determining the memory address will be described with reference to FIGS. 16B and 16C. Before the module editing, each module is assigned addresses starting from M400 for the input and M600 for the output. In this embodiment, the input device number a of the module A is assigned an address M400, the input device number b an address M401, the input device number c an address M402, the output device number d an address M600, the output device number e an address M601, the output device number f an address M602, and the output device number q an address M603. The modules B and C are also assigned addresses as shown in FIG. 16B.

After the module editing, the modules A, B and C are disposed in an array in this order in accordance with the array information. Output memories are sequentially assigned addresses M001 to M007. Input memories are linked with the device numbers a, b, c, e, a, and d and assigned addresses M005, M006, M007, M002, M004, and M001 respectively. Next, access of the system 130 to a customized module during the module editing will be described.

As described previously, LPC 51 and SFC 52 are registered in the customized stackers 155A to 155N by entering the module number while the modules are displayed and compiled. The entered module number is given, as the array information of modules, to LBD 110. In the case of the block diagram 50, standard modules used for each block are given a customized module number, and displayed and compiled. This module number is also given, as the array information of modules, to LBD 110. In accordance with the contents of the module management information file 157 composed of such information supplied to LBD 110 and the contents of the file 111, i.e., in accordance with the LBD information and interconnection information of modules, the module management system 130 is notified of module numbers each PLC uses and calls the modules from the customized module stackers 155A to 155N, and combines and edits them to generate a load module.

Figure 18:
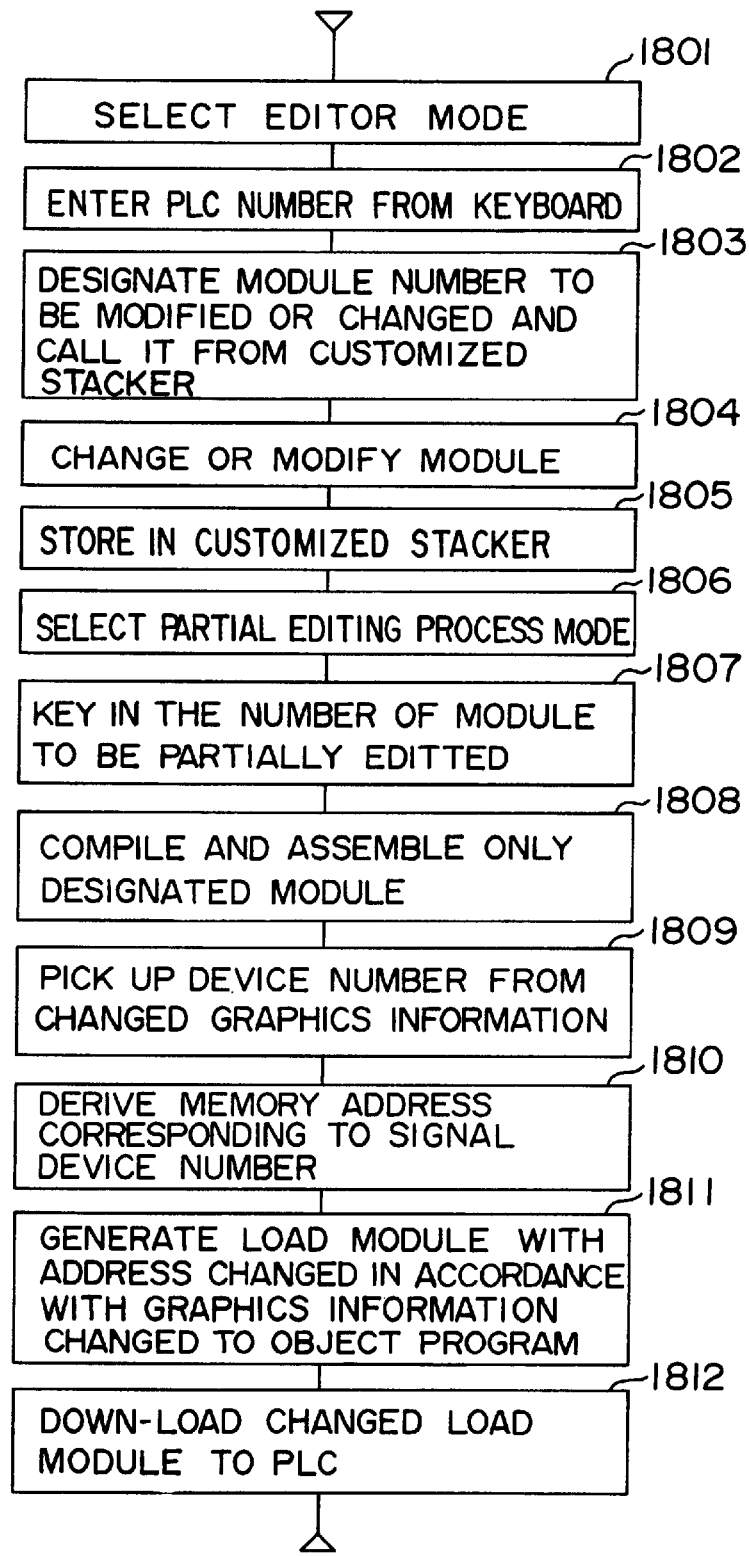
FIG. 18 is a flow chart showing the procedure of changing and modifying a module.

Next, with reference to the flow chart shown in FIG. 18, there will be described the procedure of modifying or changing a module down-loaded in each PLC, because of a design change of PLC or the like.

The editor mode is first selected, and either SFC input mode or block diagram input mode is selected depending upon whether an object module is an SFC or a block diagram (step 1801).

Next, the object PLC number as well as the object module number to be changed or modified are entered from the keyboard. The graphics display information (FG, BG) of the module used in compiling is read from one of the stackers 155A to 155N, and stored in the file 20c and displayed on CRT 21 (steps 1502 and 1503). In the stacker 155 there are stored the information before compiling (used for compiling) for each module, the object program information, and the load module information.

Figure 12:
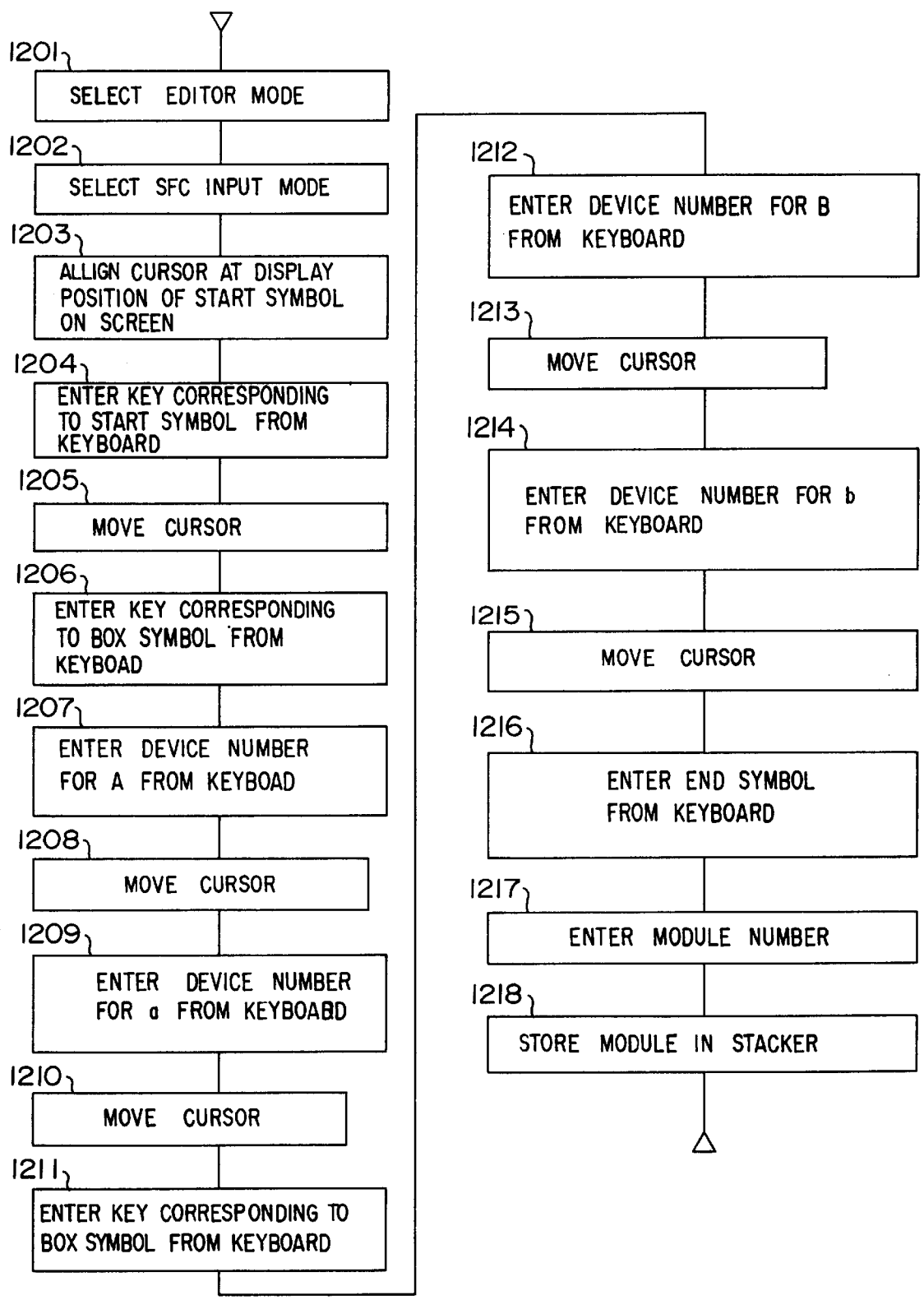
FIG. 12 is a flow chart showing the procedure of generating SFC shown in FIG. 4B.
Figure 13:
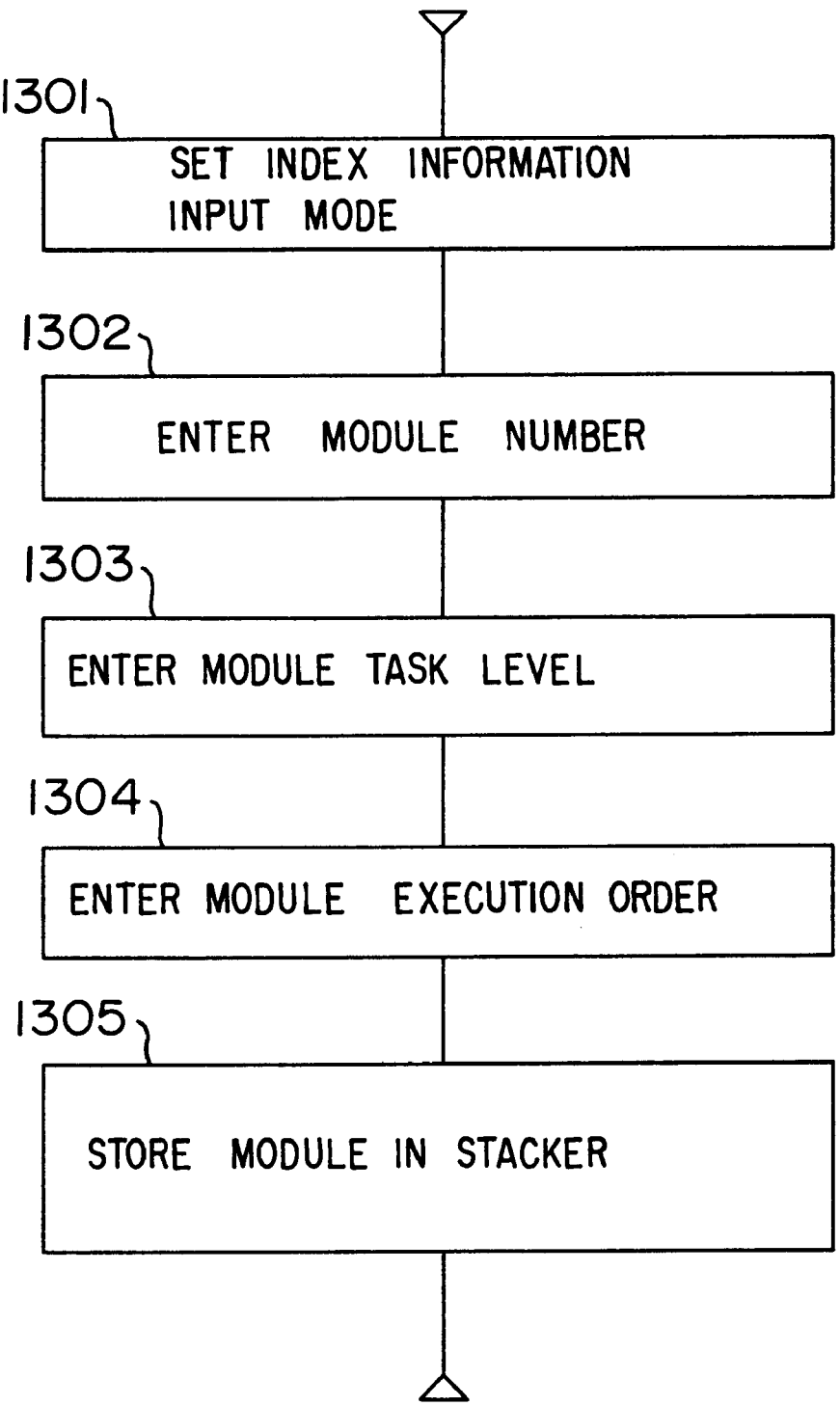
FIG. 13 is a flow chart showing the procedure of setting execution level and the like for an SFC customized module.
Figure 14A:
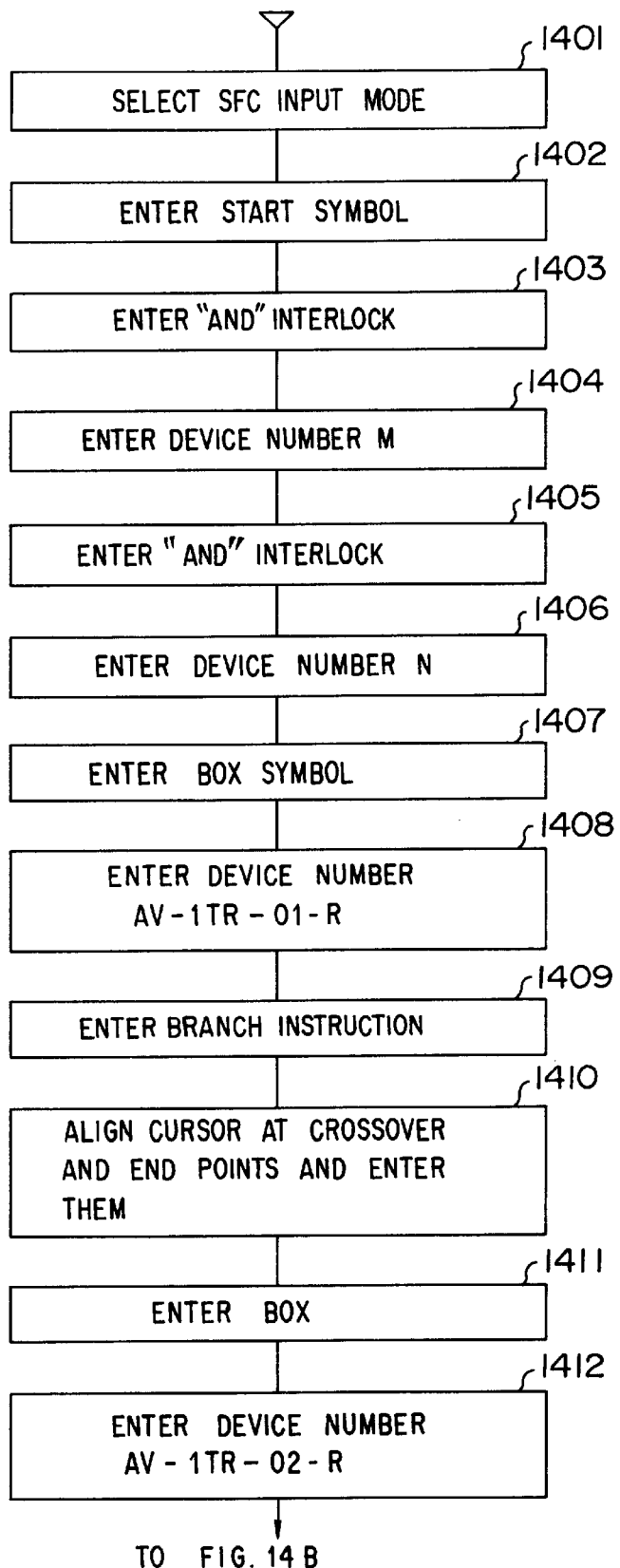
FIGS. 14A and 14B are flow charts showing the procedure of generating SFC shown in FIG. 5.
Figure 14B:
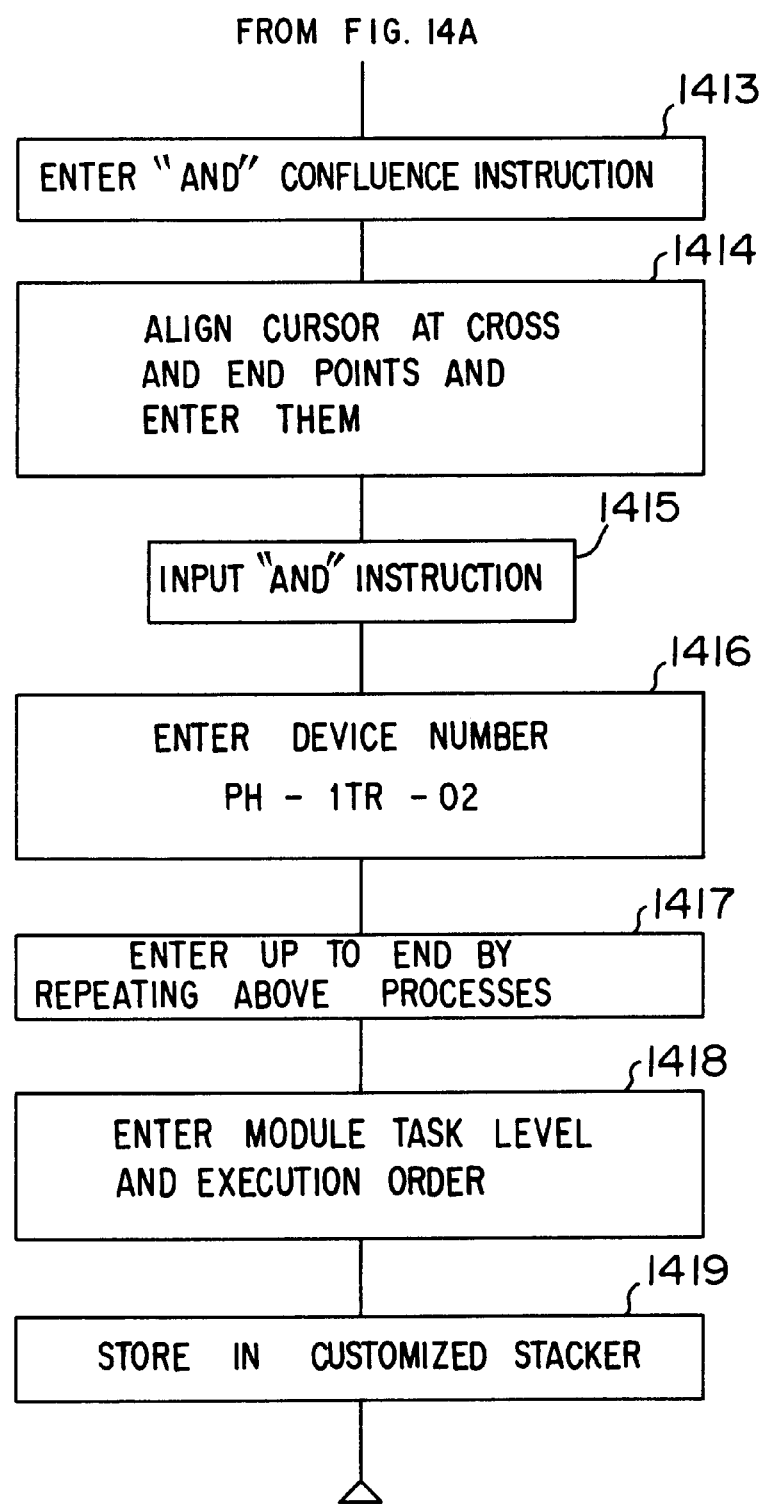

In the manner similar to the procedure shown in the flow chart of FIG. 12 or FIG. 13, a small module is deleted and/or inputted to change or modify the module, and the resultant module is stored in the same stacker 155 (steps 1504 and 1505).

In order to edit only the changed or modified module, a partial editing mode is entered from the keyboard. The module management system 130 then activates the partial editing mode (step 1806).

Upon activation of the partial editing mode, the module number of the changed or modified module to be partially edited is entered from the keyboard (step 1807). Only the module in concern is then read from the corresponding stacker 155 and compiled and assembled (step 1808). Next, the changed or modified device number of the module is read from the corresponding customized module stacker 155, and the address corresponding to the device number is read. The address of the changed or modified device number is replaced with the read-out address (steps 1809 and 1810).

The customized module stacker 155 stores the address after editing as shown in FIG. 16c. Therefore, as shown in FIG. 19A, if for example the first input signal device number e is changed to f, the address M003 corresponding to the changed device number f is read from FIG. 19A (stacker 155) and the previous address M002 is changed to M003 as shown in FIG. 19B.

If a new signal device is added to the module, it can be added in the same manner.

Next, the changed load module is down-loaded to the memory 32a of the corresponding PLC (steps 1811 and 1812).

As described above, if a module is changed or modified, only the module in concern is changed, compiled, assembled and edited without any necessity of address translation for another module.

Next, monitoring the graphics information of a program module generated as above will be described with reference to FIGS. 1 and 21.

Figure 11:
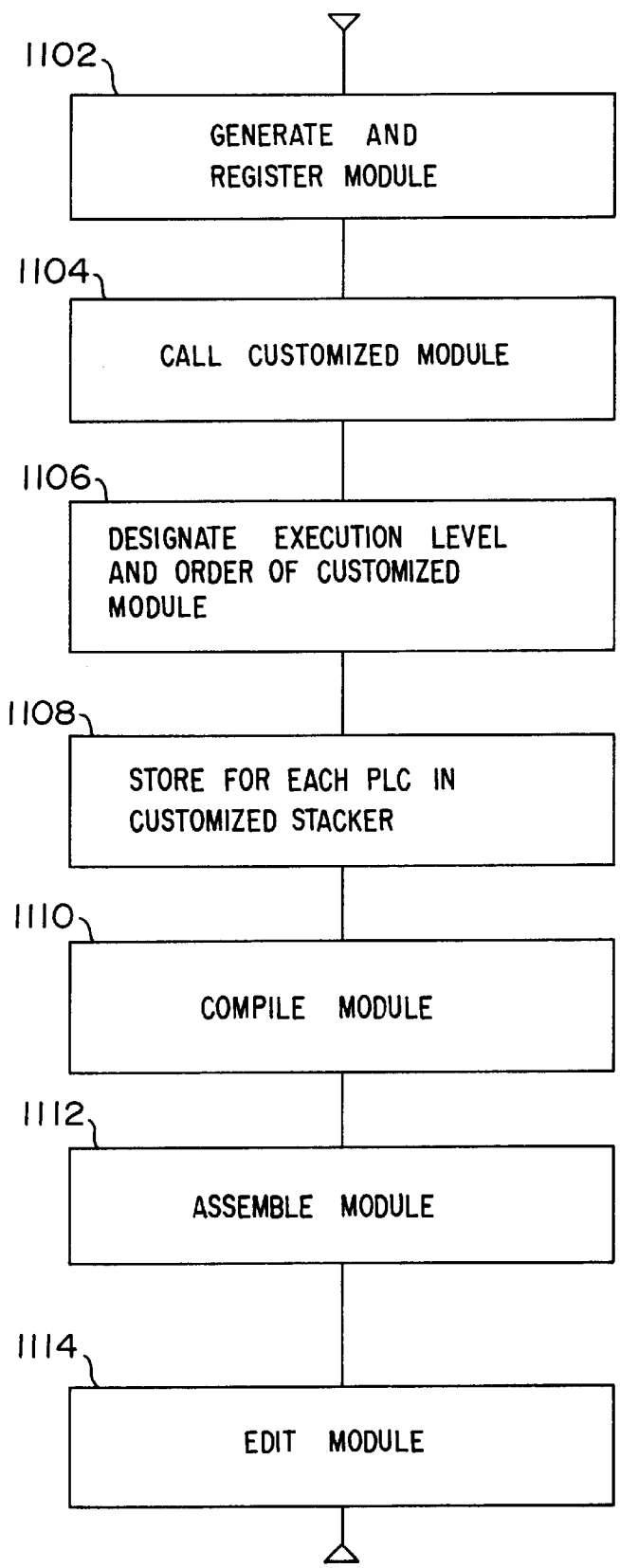
FIG. 11 is a flow chart showing the procedure for automatically generating a plant operation procedure program for the embodiment shown in FIG. 1.

As described with the flow chart shown in FIG. 11, in the editor mode a module is generated and registered in the stacker, compiled, assembled, edited, and down-loaded in the corresponding PLC (steps 2001 and 2002).

Next, the graphics information of modules before compiling is sequentially read from all the stackers 155 one after another and separated into FG and BG by the monitor information generator unit 10c3.

Figure 21A:
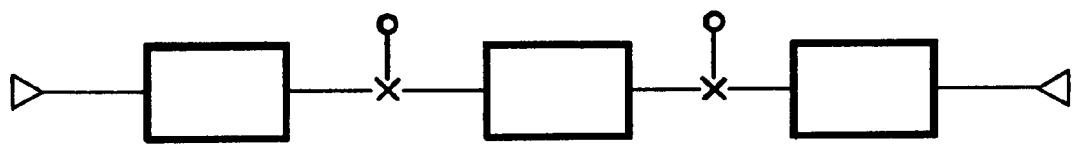
FIGS. 21A to 21C are diagrams showing examples of displayed images on a monitor screen.
Figure 21B:
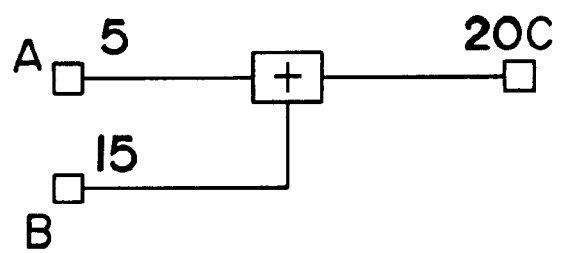
Figure 21C:
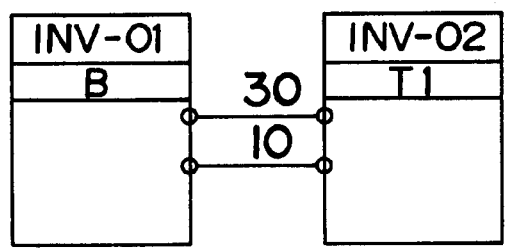

FG is the information whose data value and on-off state change, for example, the information indicated by bold lines in FIGS. 21A to 21C. BG is the fixed information whose data does not change, for example, the information indicated by fine lines in FIGS. 21A to 21C. FG is displayed by changing a numeral or a display color, whereas BG is displayed as a fixed graphics image which does not change on the screen.

The graphics information indicated by a device number is therefore the FG information which is stored in the memory 32a of each PLC 31 as shown in FIG. 16C so that each FG information is referenced to an address of the memory 32a. The monitor information generator unit therefore recognizes during the module editing which information within the memory 32a is FG information.

Next, the CRT controller 20 operates to store the position information of FG relative to BG on the screen (the position information is being stored in the file 10c3a of EWS 10 when a module is entered) and the information on whether it belongs to the color change information (e.g., in the case of a box symbol) or the numeral display information (e.g., in case of the input/output device number of an arithmetic logic) in the FG file 20f supplied via the communication line from the file 10c3a of EWS 10 (step 2004). The file stores these information for each module, and if one module requires a plurality of screen images, all screen images of the module are stored as one unit.

Next, EWS 10 generates the information indicating the correspondence between the device number of the edited module and the absolute address of the memory 32a of each PLC 31, and transfers it from the file 10c3a to PLC 30 for the CRT control (step 2005).

The above procedure is automatically executed after step 1107 shown in FIG. 11.

In each PLC 31, signals representative of the status of sensors, driving machines and the like connected to PLC are supplied and stored in the data memory 32b. The memory 32b also stores the data calculation results and the like.

When a monitor start request, the number of the module to be monitored, and its PLC number, are entered from the keyboard, they are supplied to PLC 30 via the processor units 20a and 20b (step 2007).

In accordance with the memory address correspondence information sent from EWS 10 at step 2005, PLC 30 then reads from the internal memory the FG information of the module to be monitored on the basis of the PLC number and module number. PLC 30 reads from the memory 32b of PLC 31 the status (data value, data status and the like) of the FG information and supplies it to the FG file 32f of the CRT controller 20.

In accordance with the FG data of the file 20f and the BG information of the file 20d, the on-line monitor processor unit 20b of the CRT controller 20 generates the graphics information of the module to be monitored and displays it with color or in the form of numeral as shown in FIGS. 21A to 21C. As an example of display, the on-off state may be displayed with different color, or the box symbol now under operation may be displayed in red color.

In the above manner, the operation conditions of a desired module is displayed as graphics image on CRT 21.

The graphics information representative of plant facilities to be monitored may be entered from the keyboard and displayed on CRT 21 with the FG information such as shown at 4b in FIG. 1 being superposed thereon.

In the above description, although a module under operation is monitored, a module may be read from the stacker 155 and displayed on CRT 21.

In the above embodiment, the description has been directed to a rolling plant to which the present invention was applied. The invention is not limited to such a plant, but is applicable to any program if it is used for controlling a computer controlled system. Programming language to be used in this invention is not limited to a particular language, but any language such as COBOL, C, BASIC and the like may also be used.

INDUSTRIAL APPLICABILITY

The method of and apparatus for automatically generating a program of this invention is useful for automatically generating a program for controlling a computer controlled system such as a rolling plant, chemical plant and the like. It is particularly suitable for use by the user side where professional SEs and programmers are not available in program checking, modifying, changing and the like.

What is claimed is:

1. A method of automatically generating a program for controlling apparatus, comprising the steps of:

inputting operation procedures in the form of graphic information and interconnections thereof; and selectively reading said graphic information and translating said selectively read graphic information into a program to be executed by a controller which controls the apparatus based on the translated program, wherein each of said operation procedures is represented by one of a plurality of program modules generated in accordance with interface information, and wherein said interface information includes interconnection information between said program modules, execution order information between said program modules, and input/output information of said program modules, respectively represented by said high level language.

2. An apparatus for automatically generating an execution program for controlling apparatus, comprising:

a memory which stores modules in the form of graphic information and functions and interconnections thereof;

a display which displays graphic information;

an input apparatus which inputs a selection command for selecting graphic information for display by said display means and a store command for storing graphic information displayed on said display in said memory;

a processor, responsive to said selection command, which selectively reads out modules from said memory corresponding to inputted graphic information and displays graphic information representing said modules on said display, and responsive to said store command, which stores said read-out modules in said memory as a program; and a language translator which translates said program of said stored modules into an execution program to be executed by a controller which controls the apparatus.

3. An apparatus according to claim 2, wherein said input apparatus includes means for apparatus which inputs interface information of said read-out modules, and said processor lays out a control arrangement including said read-out modules, in accordance with said inputted interface information, as said program.

4. An apparatus according to claim 3, wherein said interface information includes interconnection information between said modules, execution order information between said modules, and input/output information of said modules, respectively represented by high level language.

5. An apparatus according to claim 2, wherein logic of each of said modules represents an execution condition of a calculation of data regarding control of the apparatus.

6. An apparatus for automatically generating a program for controlling apparatus comprising:

a memory which stores standard modules in the form of graphic information respectively describing functions of the apparatus and interconnections thereof;

a display which displays graphic information;

input means for inputting a selection command for selecting graphic information for display by said display and a store command for storing graphic information displayed on said display in said memory;

a processor, responsive to said selection command, for selectively reading out standard modules from said memory corresponding to inputted graphic information and displays said graphic information on said display, and responsive to said store command, for storing said read-out standard modules in said memory; and language translation means for translating said modules into a program to be executed by a controller.

7. An apparatus according to claim 6, wherein said input apparatus includes apparatus for inputting interface information of said selected standard modules, and said processor lays out said standard modules, in accordance with said inputted interface information, as said modules.

8. An apparatus according to claim 7, wherein said interface information includes interconnection information between said standard modules, execution order information between said standard modules, and input/output information of said standard modules.

9. An apparatus according to claim 6, wherein logic of each of said standard modules represents an execution condition of or a calculation of data regarding control of the apparatus.

10. An apparatus for automatically generating a program for controlling apparatus, comprising:

a first memory which stores standard modules in the form of graphic information respectively describing functions of the apparatus; and a language translator which translates said graphic information into a program to be executed by a controller which controls the apparatus based on the translated program;

said language translation means comprises:

a second memory, first translation means for translating said graphic information representing said stored standard procedures in said first memory into a machine instruction language and storing said machine instruction language in said second memory on a unit basis, and second translation means for translating the machine instruction language stored in said second memory into a machine instruction language with an absolute address.

11. An apparatus according to claim 10, wherein logic of each of said standard modules represents an execution condition of or a calculation of data regarding control of the apparatus.

12. A method of modifying a program for controlling apparatus comprising the steps of:

designating by input apparatus one of a plurality of interconnected modules stored in a memory, reading said module from said memory, and displaying said module on a screen of a display, said module being represented by a high level language in the form of a graphic information respectively describing functions of the apparatus;

designating with said input apparatus said module to be modified as displayed on said screen, and modifying said module on said screen; and entering a store command from said input apparatus and storing said modified module on said screen in said memory to permit translation of said modified module into a program to be executed by a controller which controls the apparatus based on the translated execution program.

13. A method according to claim 12, wherein within said module a position to be modified is a coordinate value on said screen, and contents to be modified are addition, deletion or change of a high level language of said module, wherein if the contents to be modified are addition or change, said high level language to be added or changed is read from said memory to modify said module on said screen.

14. An apparatus for modifying a program for controlling apparatus comprising:
   a memory which stores modules in the form of graphic information respectively describing functions of the apparatus;
   a display which displays graphic information on a screen;
   an input apparatus which inputs a selection command for selecting graphic information representing said modules and interconnections thereof for display by said display, a modification command for designating a module to be modified as displayed on said display, and a store command for storing said graphic information displayed on said display in said memory;
   a processor, responsive to said selection command, which selectively reads out modules from said memory corresponding to graphic information and displaying said graphic information of said modules and interconnections thereof on the screen of said display, and responsive to said store command, which stores said read-out modules and interconnections thereof in said memory; and
   a language translator which translates said stored control arrangement into a program to be executed by a programmable controller which controls the devices of said apparatus based on the translated program to attain the functions of said devices,
   wherein said processor including apparatus, responsive to a modification command, which modifies said displayed control arrangement so that said program stored in said memory is automatically modified, and
   wherein a module to be modified is a coordinate value on said screen, and said contents to be modified are addition, deletion or change of a high level language of said displayed graphic information, wherein if the contents to be modified are addition or change, said high level language to be added or changed is read from said memory to modify said module.

15. A method for automatically generating an execution program for controlling apparatus, comprising the steps of:
   inputting an operation procedure of the apparatus in the form of graphic information; and
   generating an execution program for controlling the apparatus based on the input operation procedure in accordance with a predetermined relation between the respective modules; and
   inputting connection information representing relations between the modules, wherein said step of generating an execution program generates the execution program based on the inputted operation procedure in accordance with a predetermined relation among the respective modules, the connection information and execution programs corresponding to the respective modules.

16. A method for automatically generating an execution program according to claim 15, wherein the connection information includes information representing connection relation between the modules, information representing execution order of the functions of the apparatus, and information representing input and/or outputs of the devices.

17. A method for automatically generating an execution program for controlling apparatus, comprising the steps of:
   inputting a plurality of partial operation procedures in the form of graphic information respectively describing functions and interconnections of the partial operation procedures;
   generating programs in an intermediate level language and execution programs based on the inputted partial operation procedures;
   storing each of said partial operation procedures together with the corresponding program in the intermediate level language and the corresponding execution program in a memory as a module; and
   generating an execution program for controlling the apparatus based on the stored execution programs.

18. A method for automatically generating an execution program for controlling apparatus using an operation procedure input into a computer in the form of graphic information divided into modules respectively describing functions and interconnections of said apparatus, and from connection information representing the relation between the modules, comprising the steps of:
   storing the modules into a memory;
   generating programs in an intermediate level language respectively corresponding to the modules based on the inputted operation procedure in accordance with a predetermined relation between the respective modules and execution programs corresponding to the modules; and
   generating an execution program for controlling the apparatus corresponding to the inputted operation procedure based on the generated programs in the intermediate level language and said connection information.

19. The method for automatically generating the execution program according to claim 18, wherein
   a plurality of partial operation procedures constituting said operation procedure are inputted into the computer;
   wherein the programs in an intermediate level language and execution programs are generated from each of said partial operation procedures, and
   each of said partial operation procedures is stored together with the corresponding programs in the intermediate level language and the corresponding generated execution program respectively as a module in a memory.

20. An apparatus for controlling apparatus, comprising:
   a first processor representing an operation station of the apparatus;
   an input apparatus which inputs an operation procedure of the apparatus as graphic information into said first processor, in which said graphic information is divided into modules respectively describing the apparatus;
   a first translator, included in said first processor, which generates programs in an intermediate level language corresponding to the modules from said operation procedure respectively;
   a second translator, included in said first processor, which generates, based on said programs in an intermediate level language and inputted connection information representing the relation between said modules, an execution program for controlling the apparatus; and
   a second processor which executes said execution program and which controls said apparatus.

21. An apparatus for controlling apparatus, comprising:

a first processor representing an operation station of the apparatus;

an input apparatus which inputs operation procedures of the apparatus as graphic information into said first processor, in which said graphic information is divided into modules respectively describing the apparatus;

a first generator, included in said first processor, which generates programs in an intermediate level language and execution programs corresponding to the modules from said operation procedures respectively, and which respectively groups each of the operation procedures together with the corresponding program in the intermediate level language and the corresponding execution program in a module;

a second generator included in said first processor, which generates, based on said execution programs of said modules and inputted connection information representing the relation between said modules, an execution program for controlling the apparatus; and a second processor which executes said execution program and controls the apparatus.

22. A method of automatically generating a program for controlling apparatus, comprising the steps of:

inputting operation procedures of the apparatus;

generating programs described by intermediate-level language and operation execution programs respectively corresponding to the operation procedures in accordance with the operation procedures, and constituting a combination of a corresponding operation procedure, a program of intermediate-level language and an operation execution program as a module; and inputting in a computer information representing interconnections between the modules to thereby generate an operation execution program necessary for operating the apparatus based on the inputted information and the operation execution programs corresponding to the modules.

23. An apparatus for controlling apparatus by a first processor servicing an interface between the apparatus and an operator, comprising:

an input apparatus which inputs in the first processor operation procedures of the apparatus;

a first generator included in said first processor, which generates programs described by intermediate-level language and operation execution programs respectively corresponding to the operation procedures in accordance with the operation procedures, and which organizes a corresponding operation procedure, a program of intermediate-level language and an execution program language as a module;

a second generator included in said first processor, which generates, in accordance with information representing interconnections between the modules inputted therein, an operation execution program necessary for operating the apparatus based on the operation execution programs corresponding to the modules; and a second processor which controls the apparatus including apparatus which loads the operation execution program necessary for operating the apparatus and which executes the operation of the operation execution program.

24. A method of modifying a program for controlling, comprising the steps of:

reading a plurality of operation procedures from a memory and displaying on a screen graphic information representing the plurality of operation procedures thus read;

modifying a position and contents of one of the plurality of operation procedures displayed on the screen;

translating the one of the plurality of operation procedure thus modified being displayed on the screen into a program; and replacing the program thus translated for a program corresponding to the one of the plurality of operation procedures before the modification to form a program to be executed by a controller.

25. An apparatus for modifying a program for controlling, comprising:

means for reading a plurality of operation procedures from a memory and displaying on a screen graphic information representing the plurality of operation procedures thus read;

means for modifying a position and contents of one of the plurality of operation procedures displayed on the screen;

means for translating the one of the plurality of operation procedure thus modified being displayed on the screen into a program; and means for replacing the program thus translated for a program corresponding to the one of the plurality of operation procedures before the modification to form a program to be executed by a controller.

26. A method for monitoring a program for controlling, comprising the steps of:

displaying on a screen graphic information representing a plurality of operation procedures;

permitting an operator to define connections between the plurality of operation procedures displayed on the screen;

translating graphic information being displayed on the screen representing the plurality of operation procedures and the connections between the plurality of operation procedures into a program to be executed by a controller; and monitoring information representing the plurality of operation procedures and information representing the connections between the plurality of operation procedures displayed on the screen.

* * * * *